US011971998B2

United States Patent
Yoshino et al.

(10) Patent No.: US 11,971,998 B2
(45) Date of Patent: Apr. 30, 2024

(54) DATA COMPARISON DEVICE, DATA COMPARISON SYSTEM, AND DATA COMPARISON METHOD

(71) Applicant: Hitachi, Ltd., Tokyo (JP)

(72) Inventors: Masayuki Yoshino, Tokyo (JP); Ken Naganuma, Tokyo (JP); Hisayoshi Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 341 days.

(21) Appl. No.: 16/890,046

(22) Filed: Jun. 2, 2020

(65) Prior Publication Data

US 2020/0401706 A1    Dec. 24, 2020

(30) Foreign Application Priority Data

Jun. 18, 2019    (JP) .................................. 2019-112859

(51) Int. Cl.
G06F 21/60    (2013.01)
G06F 7/02     (2006.01)
H04L 9/32     (2006.01)

(52) U.S. Cl.
CPC .............. G06F 21/602 (2013.01); G06F 7/02 (2013.01); H04L 9/3242 (2013.01)

(58) Field of Classification Search
CPC ......... G06F 21/602; G06F 7/02; H04L 9/3242
See application file for complete search history.

(56) References Cited

U.S. PATENT DOCUMENTS

| 2004/0086117 | A1* | 5/2004 | Petersen | H04L 9/0668 380/44 |
| 2009/0323959 | A1* | 12/2009 | Hara | G09C 5/00 380/28 |
| 2010/0303229 | A1* | 12/2010 | Unruh | H04L 9/0643 380/28 |

(Continued)

FOREIGN PATENT DOCUMENTS

WO    2015/052957 A1    4/2015

OTHER PUBLICATIONS

Extended European Search Report received in Application No. 20178338.8 dated Sep. 29, 2020.

(Continued)

*Primary Examiner* — Alexander Lagor
*Assistant Examiner* — Zoha Piyadehghibi Tafaghodi
(74) *Attorney, Agent, or Firm* — MATTINGLY & MALUR, PC

(57) ABSTRACT

A data comparison device holds first and second encrypted data of first and second plaintext, respectively. The first plaintext is divided into a plurality of blocks and the first encrypted data is generated by executing encryption of each of the plurality of blocks and shuffling of the plurality of blocks. The second plaintext is divided into a plurality of blocks and the second encrypted data is generated by executing encryption of each of the plurality of blocks. In at least one of the first encrypted data and the second encrypted data, a plaintext value is embedded as a value indicating a magnitude comparison result, and the data comparison device compares blocks at the same position before shuffling of the first encrypted data and the second encrypted data based on the embedded value and determines a magnitude relationship between the first plaintext and the second plaintext.

9 Claims, 18 Drawing Sheets

(56) References Cited

U.S. PATENT DOCUMENTS

| | | | | |
|---|---|---|---|---|
| 2012/0082306 A1* | 4/2012 | Hulse | ................ | G06F 21/36 |
| | | | | 380/28 |
| 2012/0198241 A1* | 8/2012 | O'Hare | ................ | G06F 21/32 |
| | | | | 713/189 |
| 2015/0127950 A1* | 5/2015 | Irvine | ................ | H04L 9/0662 |
| | | | | 713/184 |
| 2016/0240108 A1 | 8/2016 | Furukawa | | |
| 2019/0018968 A1* | 1/2019 | Ronca | ................ | G06F 21/577 |
| 2019/0103959 A1* | 4/2019 | Roake | ................ | H04L 9/0894 |

OTHER PUBLICATIONS

Furukawa Jun Ed—Andrea K et al; "Request-Based Comparable Encryptions"; Sep. 9, 2013; Advances in Databases and Information Systems; Springer International Publishing, pp. 129-146.

Chen Peng et al.; "Efficient request-based comparable encryption scheme based on sliding window method"; vol. 20, No. 11, Jul. 18, 2015, pp. 4589-4596.

Meng Qian et al.; "Privacy-Preserving Comparable Encryption Scheme in Cloud Computing"; Oct. 21, 2017, Annual International Conference on the Theory and Applications of Cryptographic Techniques, pp. 148-162.

Furukawa Jun Ed—Ando N et al.; "Short Comparable Encryption" Oct. 22, 2014, Annual International Conference on the Theory and Applications of Cryptographic Techniques, pp. 337-352.

David Cash et al.; "Dynamic Searchable Encryption in Very-Large Databases: Data Structures and Implementaion", ACR, International Association for Cryptologic Research; vol. 20141022:163708, Oct. 17, 2014, pp. 1-32.

\* cited by examiner

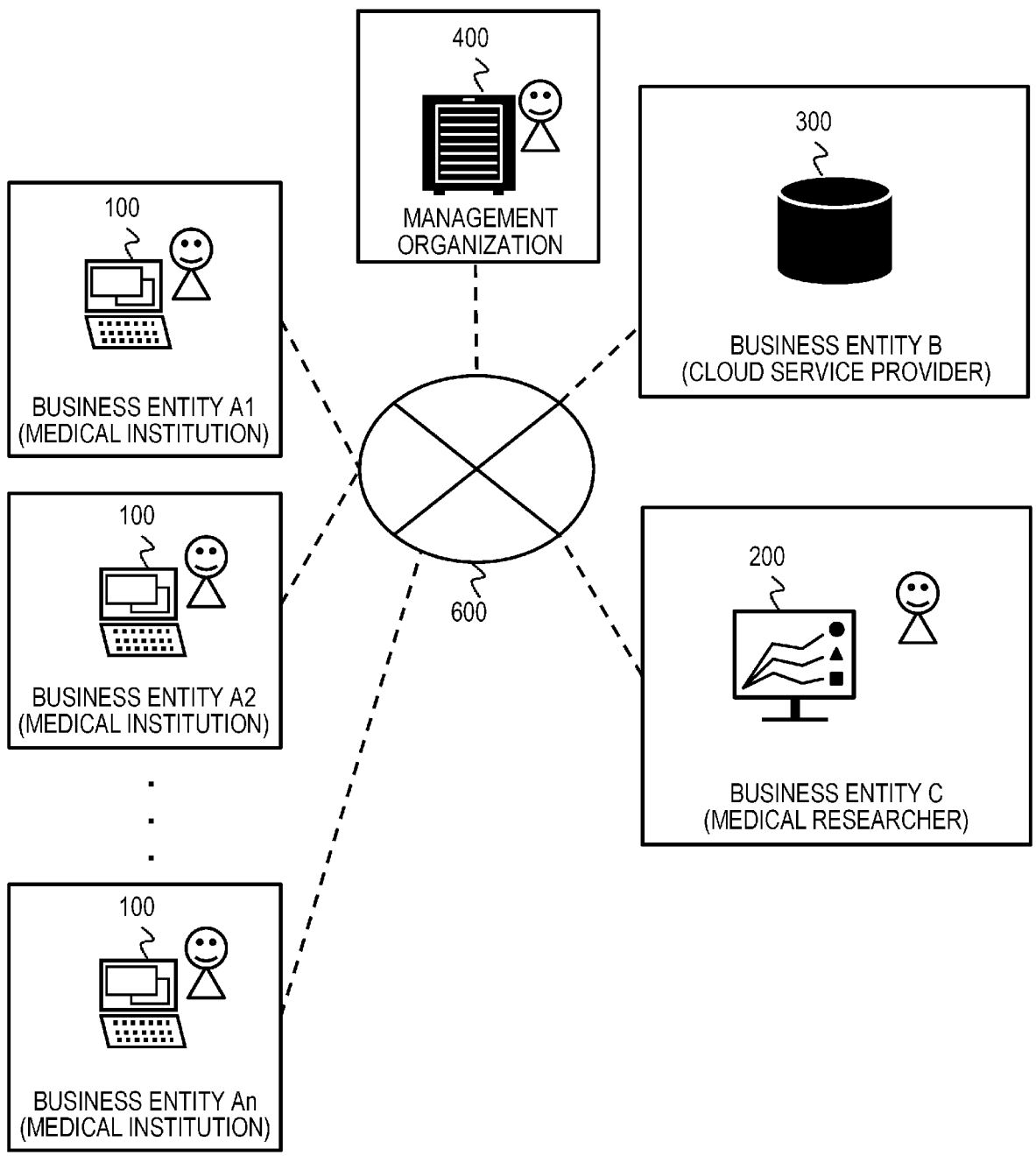

FIG. 2A

| FULL NAME | DISEASE CODE | BIRTH DATE | MEDICAL INSTITUTION CODE | DAYS OF HOSPITALIZATION | ... |
|---|---|---|---|---|---|
| ICHIRO TANAKA | 8840652 | 19701010 | 410993 | 20 | ... |
| JIRO YAMADA | 4730002 | 19650227 | 5111067 | 7 | ... |
| KENTA MAEDA | 6009005 | 19880411 | 802965 | 13 | ... |
| KOJI YAMAMOTO | 8834244 | 19461025 | 110257 | 3 | ... |
| HANAKO SATO | 8832345 | 19660730 | 1305457 | 6 | ... |

FIG. 2B

| FULL NAME | DISEASE CODE | BIRTH DATE | MEDICAL INSTITUTION CODE | DAYS OF HOSPITALIZATION | ... |
|---|---|---|---|---|---|
| E(ICHIRO TANAKA) | E(8840652) | E(19701010) | E(410993) | E(20) | ... |
| E(JIRO YAMADA) | E(4730002) | E(19650227) | E(5111067) | E(7) | ... |
| E(KENTA MAEDA) | E(6009005) | E(19880411) | E(802965) | E(13) | ... |
| E(KOJI YAMAMOTO) | E(8834244) | E(19461025) | E(110257) | E(3) | ... |
| E(HANAKO SATO) | E(8832345) | E(19660730) | E(1305457) | E(6) | ... |

FIG. 2C

| DISEASE CODE | BIRTH DATE | MEDICAL INSTITUTION CODE | DAYS OF HOSPITALIZATION |
|---|---|---|---|
| E(8840652) | E(19701010) | E(410993) | E(20) |
| E(6009005) | E(19880411) | E(802965) | E(13) |

FIG. 2D

| DISEASE CODE | BIRTH DATE | MEDICAL INSTITUTION CODE | DAYS OF HOSPITALIZATION |
|---|---|---|---|
| 8840652 | 19701010 | 410993 | 20 |
| 6009005 | 19880411 | 802965 | 13 |

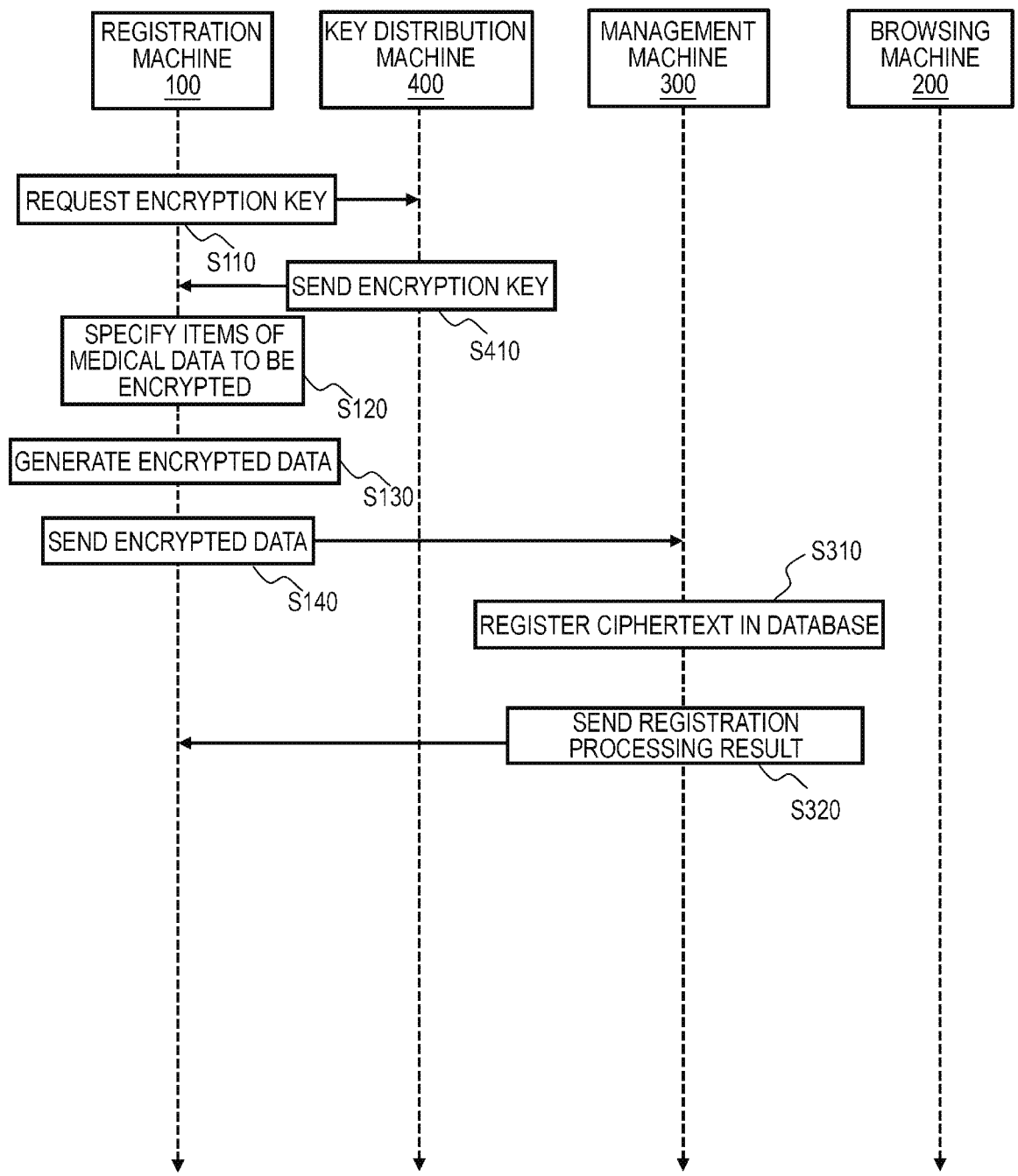

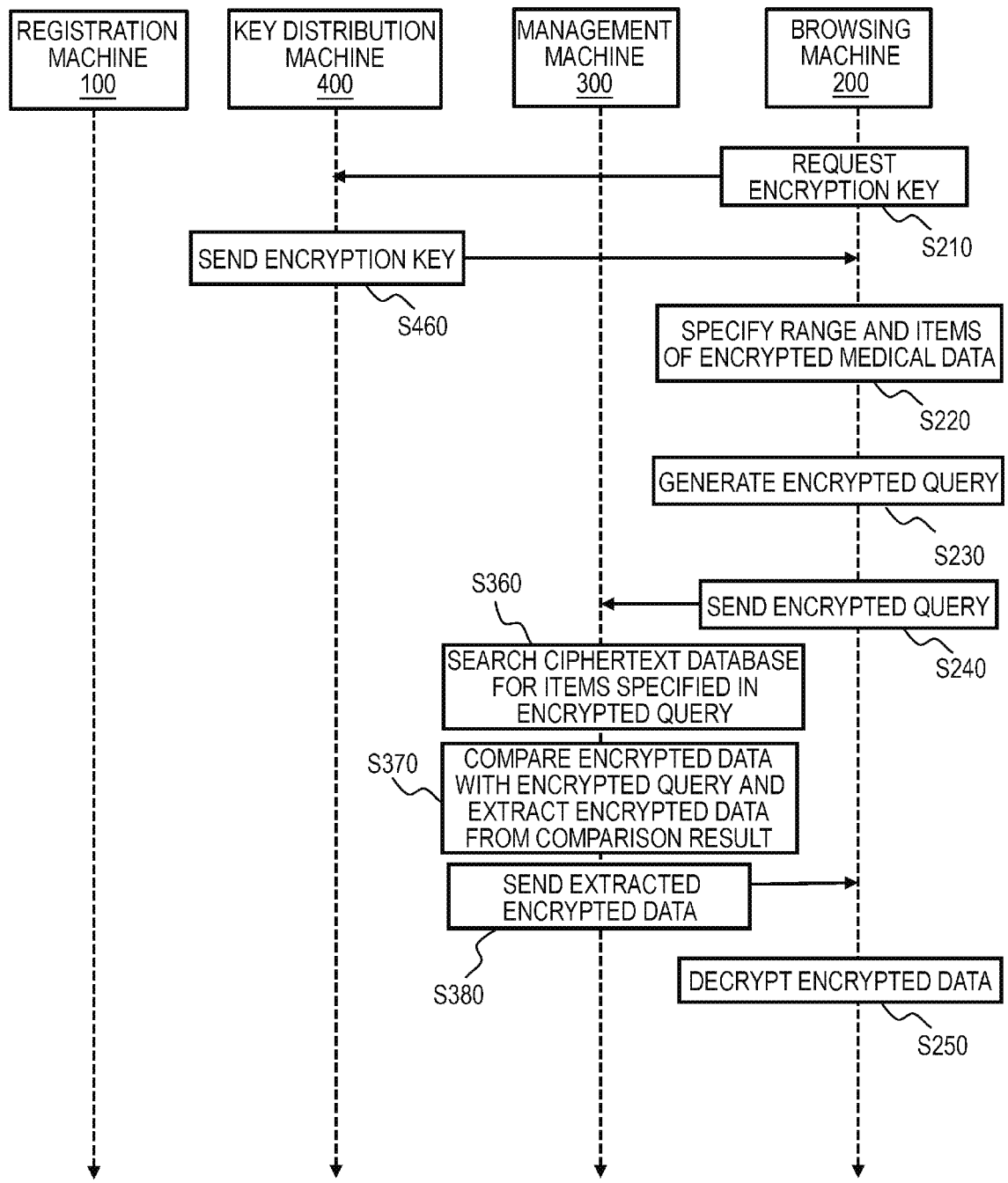

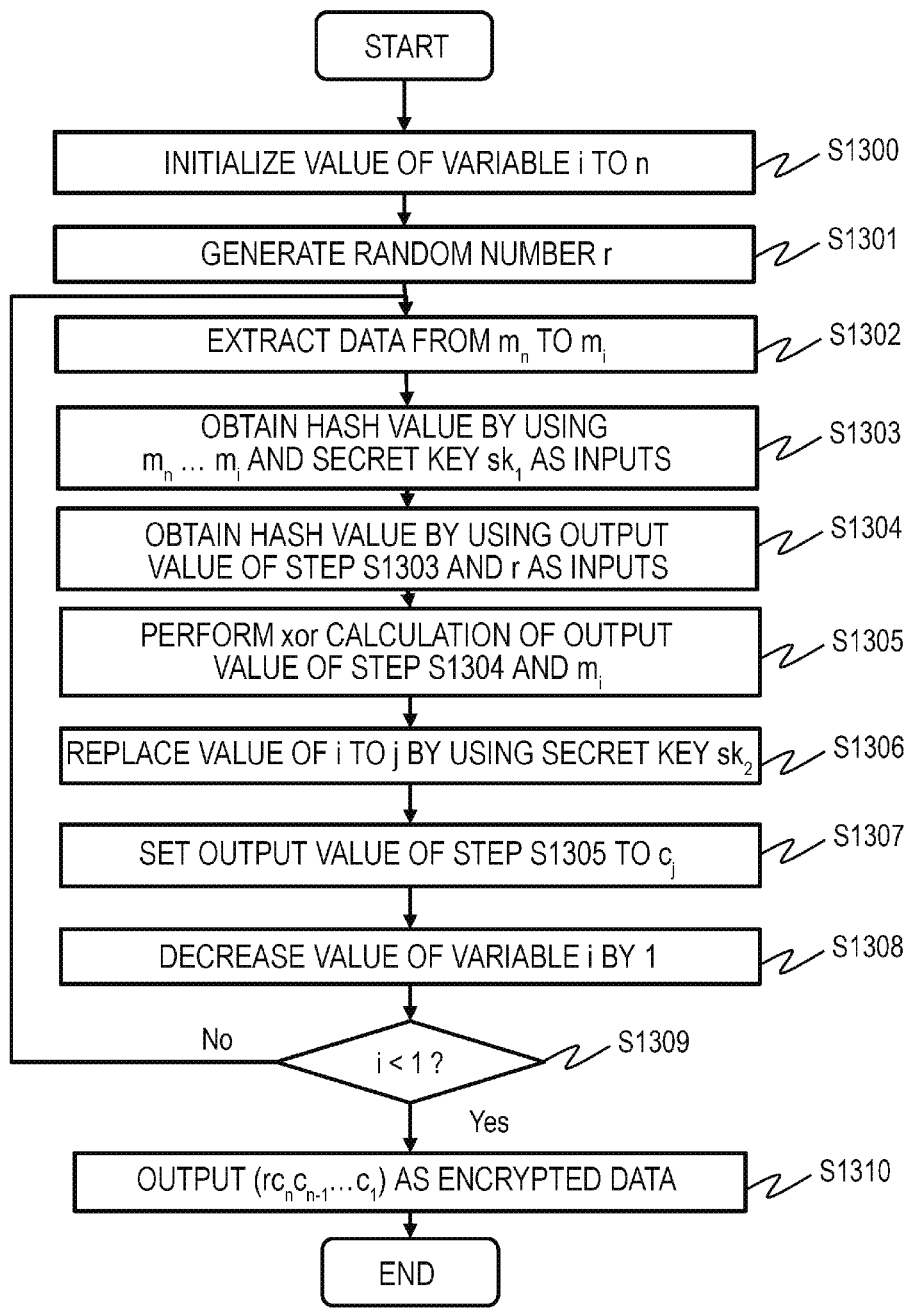

DATA COMPARISON DEVICE, DATA COMPARISON SYSTEM, AND DATA COMPARISON METHOD

CLAIM OF PRIORITY

The present application claims priority from Japanese patent application JP2019-112859 filed on Jun. 18, 2019, the content of which is hereby incorporated by reference into this application.

BACKGROUND OF THE INVENTION

1. Field of the Invention

The present invention relates to a data comparison device, a data comparison system, and a data comparison method.

2. Description of Related Art

As a background art in this technical field, there is Japanese Patent Application No. 2015-541450. This application discloses "The device of the present invention is a ciphertext generating device capable of comparing the magnitudes of encrypted numerical values, and maintaining secrecy and greatly reducing opportunities for information leakage. This ciphertext generating device includes a derived key generation unit that generates a derived key based on a primary key and a document, an auxiliary derived key generation unit that generates an auxiliary derived key based on the primary key, the document, and the derived key, an identifier-specific ciphertext generation unit that generates an identifier-specific ciphertext in which an identifier is encrypted based on an identifier of the document, the derived key, and the auxiliary derived key, and a relative value ciphertext generation unit that generates a relative value ciphertext obtained by encrypting a relative value generated from the primary key, the document, and the derived key based on an identifier derivation key, in which a character string including the identifier-specific ciphertext and the relative value ciphertext is used as a ciphertext for the document." (see abstract).

The technology described in International Publication No. 2015/052957 encrypts data and determines the result of magnitude comparison without decrypting the encrypted data. However, with the technology described in International Publication No. 2015/052957, there is a possibility that similarity between encrypted data may be found from the determination result of magnitude comparison between the encrypted data.

For example, according to the technology described in International Publication No. 2015/052957, when Number 3, Number 4, and Number 6 are encrypted and compared, in addition to the determination result of 3<4<6, similarity is found that 3 and 4 are closer to 4 and 6. The fact that the similarity is found means that excessive information leakage other than the result of the magnitude comparison has occurred. As a result, there is a possibility that unauthorized decryption of the encrypted data will eventually be possible.

SUMMARY OF THE INVENTION

Therefore, an object of one embodiment of the present invention is to compare encrypted data while preventing unauthorized decryption of the encrypted data.

In order to solve the above-described problem, one embodiment of the present invention employs the following configuration. A data comparison device includes a processor and a memory, in which the memory saves first encrypted data in which a first plaintext is encrypted, and second encrypted data in which a second plaintext to be compared for magnitude comparison with the first plaintext is encrypted, for the first plaintext divided into a plurality of blocks, the first encrypted data is data generated by executing processing including encryption of each of the plurality of blocks and shuffling of the plurality of blocks, for the second plaintext divided into the plurality of blocks, the second encrypted data is data generated by executing processing including encryption of each of the plurality of blocks, in at least one of the first encrypted data and the second encrypted data, a value of the at least one plaintext is embedded as a value indicating a magnitude comparison result, and the processor compares blocks at the same position before shuffling of the first encrypted data and the second encrypted data based on the embedded value of the at least one plaintext and determines a magnitude relationship between the first plaintext and the second plaintext.

According to one embodiment of the present invention, encrypted data can be compared while preventing unauthorized decryption of the encrypted data.

Problems, configurations, and effects other than those described above will be apparent from the following description of the embodiments.

BRIEF DESCRIPTION OF THE DRAWINGS

FIG. 1 is a block diagram illustrating an example of a schematic configuration of an encrypted data comparison system in Example 1;

FIG. 2A is an example of a list of medical data registered in a registration machine by a medical institution in Example 1;

FIG. 2B is an example of a list of encrypted medical data stored in a management machine in Example 1;

FIG. 2C is an example of encrypted medical data extracted in the management machine in Example 1;

FIG. 2D is an example of medical data decrypted in a browsing machine in Example 1;

FIG. 4 is a sequence diagram illustrating an example of data registration processing in Example 1;

FIG. 5 is a sequence diagram illustrating an example of data comparison processing in Example 1;

FIG. 6 is a flowchart illustrating an example of encrypted data generation processing in Example 1;

DESCRIPTION OF EMBODIMENTS

Figure 3A:
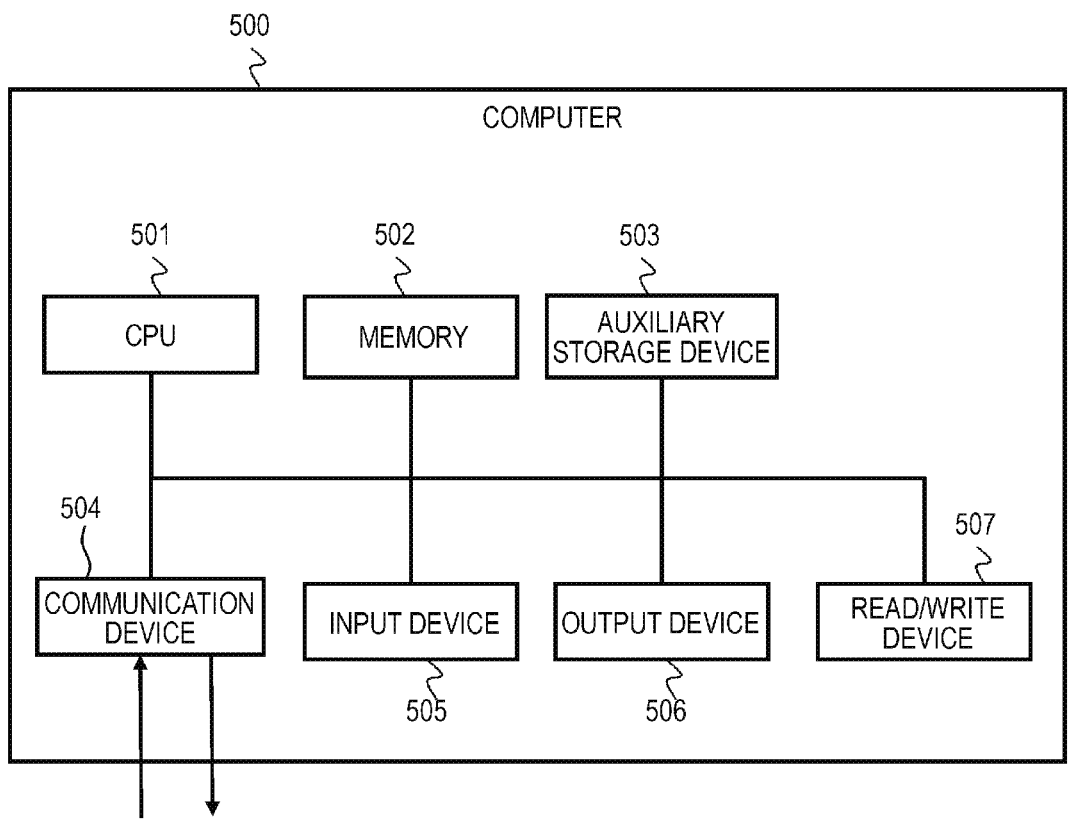
FIG. 3A is a block diagram illustrating a hardware configuration example of a computer that realizes each of the registration machine, the browsing machine, the management machine, and a key distribution machine in Example 1.

Hereinafter, embodiments of the present invention will be described in detail with reference to drawings. The present invention is not limited thereto. In the embodiments, the same members are given the same reference numerals in principle, and the repeated description is omitted. First, terms used in the present embodiment are defined.

(1) Hash Function

This is a compression function for outputting fixed-length data from arbitrary-length input data. The output data is called a hash value. In particular, in the present embodiment, a cryptographic hash function having the irreversibility of obtaining input data from output data and a difficulty of collision in which it is difficult to find arbitrary input data having the same hash value is used. SHA-256, SHA-3, and the like are all examples of such a hash function.

(2) Private Key

In the present embodiment, a secret key input to a hash function, a replacement secret key for shuffling, and a secret key for decrypting encrypted data are used. Hereinafter, the secret key input to the hash function is denoted by hk (hash key), the replacement secret key is denoted by sk (shuffle key), and the secret key for decryption is denoted by dk (decryption key).

(3) Data

The data to be encrypted is also called plaintext data or simply data. After encryption, the data is also called encrypted data.

(4) Query

In the present embodiment, a comparison target with data is also called a query. The query before encryption is also called a plaintext query or simply a query. After encryption, the query is also called an encrypted query.

(5) Exclusive OR

The exclusive OR of two bits is written as xor. Since a bit value is 0 or 1, the exclusive OR of the bit value is 0 xor 0=0, 0 xor 1=1, 1 xor 0=1, or 1 xor 1=0. In the present embodiment, this exclusive OR is also referred to xor operation.

(6) Remainder Addition

The calculation that adds two integers and calculates the remainder when divided by an integer p is called mod p. For example, since an integer greater than or equal to 0 and less than 3 is 0, 1, or 2, when p is 3, 0+0 mod 3=0, 0+1 mod 3=1, 0+2 mod 3=2, 1+0 mod 3=1, 1+1 mod 3=2, 1+2 mod 3=0, 2+0 mod 3=2, 2+1 mod 3=0, or 2+2 mod 3=1. In the present embodiment, this remainder addition is also referred to as mod operation.

Example 1

FIG. 1 is a block diagram illustrating an example of a schematic configuration of an encrypted data comparison system. The encrypted data comparison system includes, for example, a key distribution machine 400 owned by a key management organization, for example, a registration machine 100 owned by one or more business entities A (1 to n), a management machine 300 owned by a business entity B, and a browsing machine 200 owned by a business entity C, and the respective devices are connected to each other via a network 600 such as the Internet.

An example of application of the present embodiment to a health examination business will be described. Hereinafter, it is assumed that the business entity A (1 to n) is a "medical institution", the business entity B is a "cloud service provider", and the business entity C is a "medical researcher".

The medical researcher operates to deposit information systems in the management machine 300 of the cloud service provider. Therefore, the medical data acquired from the medical institution is deposited in the management device 300. The medical data is personal information possessed by the medical institution, and therefore the data must be handled carefully so as not to be leaked to others. The details of the medical data will be described later with reference to FIG. 2A.

Therefore, the registration machine 100 encrypts the data items specified by the medical institution in the input medical data with an encryption key issued by the key distribution machine 400 of the key management organization, and then deposits the data items with the management machine 300 of the cloud service provider. That is, the contents of the encrypted items in the medical data are not disclosed to the cloud service provider.

Since the medical researcher needs medical data, the medical researcher requests the medical data from a cloud service provider that stores the medical data. Details will be described later with reference to FIG. 2D. The management machine 300 of the cloud service provider manages the medical data in an encrypted state. Details of the encrypted medical data will be described later with reference to FIG. 2B. The management machine 300 of the cloud service provider compares the encrypted data and extracts the encrypted data based on the comparison result. Details of the extracted encrypted data will be described later with reference to FIG. 2C.

FIGS. 2A to 2D are specific examples of data handled in the present example. FIG. 2A is an example of a list of medical data registered in the registration machine 100 by the medical institution. FIG. 2B is an example of a list of encrypted medical data stored in the management machine 300. FIG. 2C is an example of the encrypted medical data extracted in the management machine 300. FIG. 2D is an example of the medical data decrypted in the browsing machine 200.

The data in each row in FIG. 2A is also referred to as "individual medical data". The key distribution machine 400 of the key distribution station issues an encryption key for each specified item, and the registration machine 100 of the medical institution encrypts individual medical data by using the issued encryption key.

The data in each row in FIG. 2B is also referred to as "individual encrypted medical data". E(x) indicates a value obtained by encrypting a certain value x. FIG. 2C is a part of the medical data extracted by the comparison determination in the specified item. In this example, a record having a birth date of 1980 or later or days of hospitalization of 20 days or more was selected by comparison determination, and the disease code, birth date, medical institution code, and days of hospitalization of the record were extracted.

FIG. 2D is data obtained by decrying the extraction result of FIG. 2C. This data is provided to the medical researcher and can be viewed by using the browsing machine 200. The above medical data is only an example. A plurality of ciphertexts may be combined as needed. For example, each item may be encrypted by a different method such as block encryption, searchable encryption, and public key encryption.

FIG. 3A is a block diagram illustrating a hardware configuration example of a computer that realizes each of the registration machine 100, the browsing machine 200, the management machine 300, and the key distribution machine 400. The computer 500 includes, for example, a central processing unit (CPU) 501, a memory 502, an auxiliary storage device 503, a communication device 504, an input device 505, an output device 506, and a read/write device 507, which are mutually connected by an internal communication line such as a bus.

The CPU 501 includes a processor, and the processor executes a program stored in the memory 502. The memory 502 includes a ROM as a non-volatile storage element and a RAM as a volatile storage element. The ROM stores immutable programs (for example, BIOS) and the like. The RAM is a high-speed and volatile storage element such as a dynamic random access memory (DRAM) and temporarily stores a program executed by the CPU 501 and data used when the program is executed.

The auxiliary storage device 503 is a large-capacity and non-volatile storage device such as a magnetic storage device (HDD) or a flash memory (SSD) and stores a program executed by the CPU 501 and data used when the program is executed. That is, the program is read from the auxiliary storage device 503, loaded into the memory 502, and executed by the CPU 501.

The input device 505 is a device that receives input from an operator, such as a keyboard and a mouse. The output device 506 is a device, such as a display device or a printer, that outputs the execution result of the program in a format that can be visually recognized by the operator.

The communication device 504 is a network interface device that controls communication with another device according to a predetermined protocol. The communication interface 104 includes, for example, a serial interface such as USB.

The read/write device 507 reads data from a removable medium (CD-ROM, flash memory, and the like) and writes data to the removable medium. The program executed by the CPU 501 is provided to the computer 500 via a removable medium or the network 600 and is stored in the non-volatile auxiliary storage device 503 which is a non-temporary storage medium.

The registration machine 100, the browsing machine 200, the management machine 300, and the key distribution machine 400 are each a computer system physically configured on one computer 500 or on a plurality of logically or physically configured computers 500, and may operate in separate threads on the same computer 500 and may operate on a virtual computer constructed on a plurality of physical computer resources.

In the present embodiment, the information used by an encrypted data comparison and determination system may be expressed by any data structure without depending on the data structure. For example, a data structure appropriately selected from a table, list, database or queue can store the information.

Figure 3B:
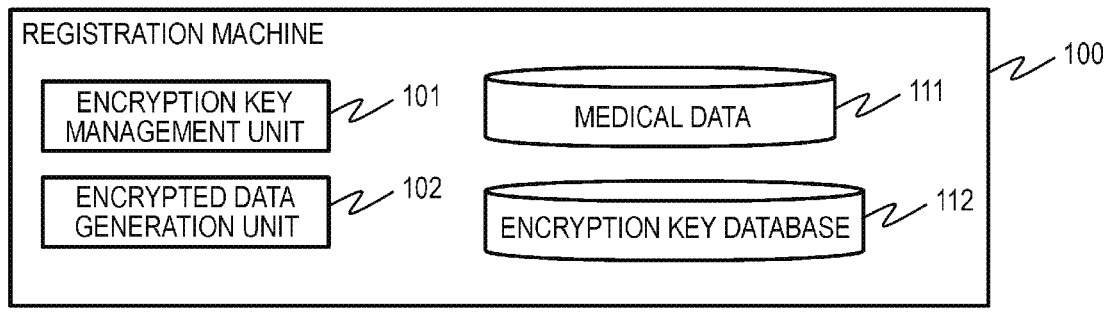
FIG. 3B is a block diagram illustrating an example of a functional configuration of the registration machine in Example 1.

FIG. 3B is a block diagram illustrating a functional configuration example of the registration machine 100. The registration machine 100 includes, for example, an encryption key management unit 101 and an encrypted data generation unit 102. The encryption key management unit 101 and the encrypted data generation unit 102 are included in the processor of the CPU 501 of the registration machine 100.

The processor functions as the encryption key management unit 101 by operating in accordance with the encryption key management program loaded into the memory 502 and functions as the encrypted data generation unit 102 by operating in accordance with the encrypted data generation program loaded in the memory 502. The same applies to the relationship between the functional units of other devices included in the encrypted data comparison system and the processor. The encryption key management unit 101 manages an encryption key for encrypting data. The encrypted data generation unit 102 generates encrypted data from plaintext data.

The registration machine 100 holds, for example, medical data 111 and an encryption key database 112. The medical data 111 and the encryption key database 112 are stored in the memory 502 and/or the auxiliary storage device 503 of the registration machine 100. The medical data 111 includes plaintext data to be encrypted. The encryption key database 112 holds the encryption key received from the key distribution device 400.

Figure 3C:
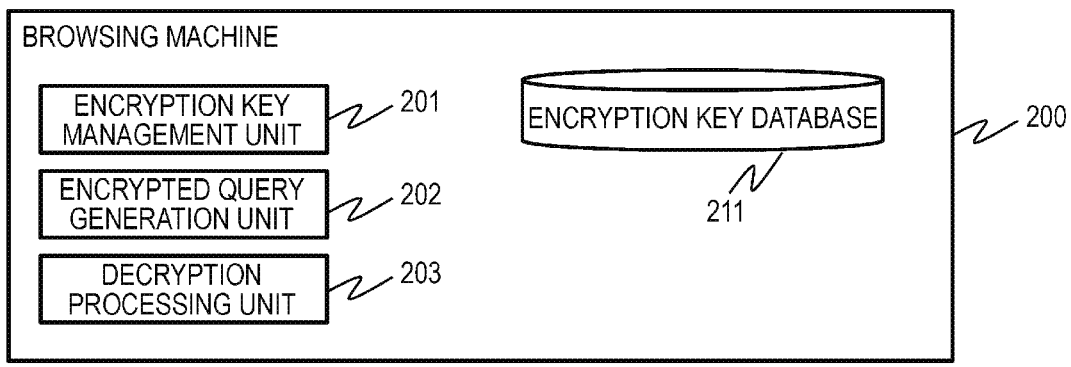
FIG. 3C is a block diagram illustrating an example of a functional configuration of the browsing machine in Example 1.

FIG. 3C is a block diagram illustrating a functional configuration example of the browsing machine 200. The browsing machine 200 includes, for example, an encryption key management unit 201, an encrypted query generation unit 202, and a decryption processing unit 203. The encryption key management unit 201, the encrypted query generation unit 202, and the decryption processing unit 203 are included in the processor of the CPU 501 of the browsing machine 200.

The encryption key management unit 201 manages an encryption key. The encrypted query generation unit 202 generates an encrypted query for comparison with the encrypted data. The decryption processing unit 203 decrypts a ciphertext indicating a comparison result between the encrypted data received from the management device 300 and an encrypted query.

The browsing machine 200 holds, for example, an encryption key database 211. The encryption key database 211 is stored in the memory 502 and/or the auxiliary storage device 503 of the browsing machine 200. The encryption key database 211 holds the encryption key received from the key distribution machine 400.

Figure 3D:
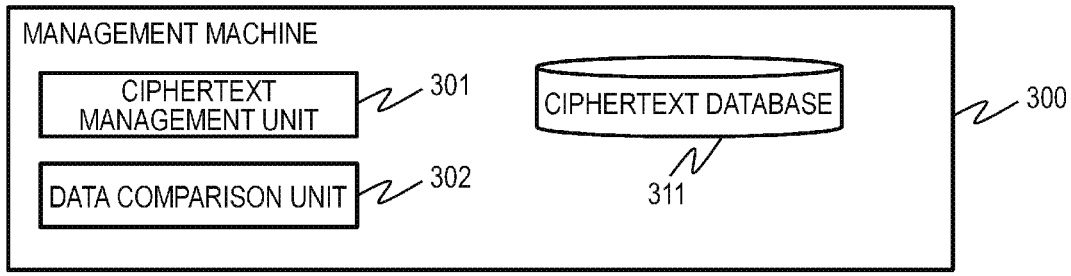
FIG. 3D is a block diagram illustrating an example of a functional configuration of the management machine in Example 1.

FIG. 3D is a block diagram illustrating a functional configuration example of the management machine 300. The management machine 300 includes, for example, a ciphertext management unit 301 and a data comparison unit 302. The ciphertext management unit 301 and the data comparison unit 302 are included in the processor of the CPU 501 of the management machine 300. The ciphertext management unit 301 manages the encrypted data received from the registration machine 100. The data comparison unit 302 compares the encrypted data received from registration machine 100 with the encrypted query received from browsing machine 200.

The management machine 300 holds, for example, a ciphertext database 311. The ciphertext database 311 is stored in the memory 502 and/or the auxiliary storage device 503 of the management machine 300. The ciphertext database 311 holds the encrypted data received from the registration machine 100.

Figure 3E:
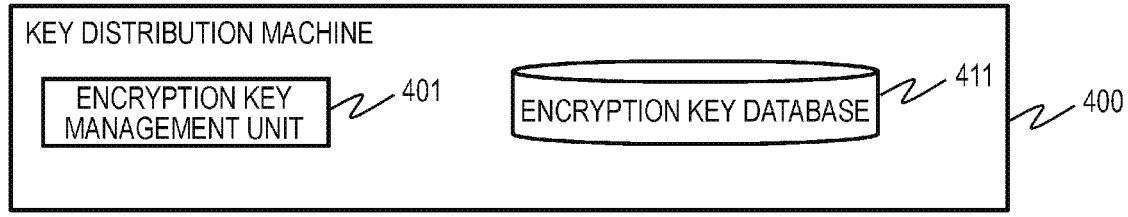
FIG. 3E is a block diagram illustrating an example of a functional configuration of the key distribution machine in Example 1.

FIG. 3E is a block diagram illustrating a functional configuration example of the key distribution machine 400. The key distribution machine 400 includes, for example, an encryption key management unit 401. The encryption key management unit 401 is included in the processor of the CPU 501 of the key distribution machine 400. The encryption key management unit 401 manages encryption keys used for encrypted data generation processing, encrypted query generation processing, and comparison processing between encrypted data and an encrypted query.

The key distribution machine 400 holds an encryption key database 411. The encryption key database 411 is stored in the memory 502 and/or the auxiliary storage device 503 of the key distribution machine 400. The encryption key database 411 holds an encryption key. Hereinafter, an example of processing by the encrypted data comparison and determination system will be described. The processing includes data registration processing and data comparison determination processing.

FIG. 4 is a sequence diagram illustrating an example of the data registration processing. The encryption key management unit 101 of the registration machine 100 requests the key distribution machine 400 to transmit an encryption key (S110). The encryption key management unit 401 of the key distribution machine 400 sends the encryption key stored in the encryption key database 411 to the registration machine 100, and the encryption key management unit 101 of the registration machine 100 stores the received encryption key in the encryption key database 112 (S410).

The encrypted data generation unit 102 of the registration machine 100 specifies items of the medical data 111 to be encrypted (S120). Specifically, for example, the encrypted data generation unit 102 specifies an item according to an input of a user of the registration machine 100. In the example of FIG. 2A described above, the encrypted data generation unit 102 specifies items such as "birth date" and "days of hospitalization".

The encrypted data generation unit 102 of the registration machine 100 generates encrypted data by using the encryption key sent in step S110 (S130). Details of the encrypted data generation processing will be described later with reference to FIGS. 6 and 7.

The encrypted data generation unit 102 sends the encrypted data generated in step S130 to the management machine 300 (S140). The ciphertext management unit 301 of the management machine 300 registers the ciphertext sent in step S140 in the ciphertext database 311 (S310). The ciphertext management unit 301 sends the result of the registration processing in step S310 to the registration machine 100 (S320).

The above-described processing procedure is merely an example, and the processing order and processing contents may be changed as necessary. For example, when the registration machine 100 and the key distribution machine 400 belong to the same entity, some processing may be omitted, such as the registration machine 100 having an encryption key in advance without the key distribution machine 400 sending the encryption key to the registration machine 100.

FIG. 5 is a sequence diagram illustrating an example of the data comparison processing. The encryption key management unit 201 of the browsing machine 200 requests an encryption key from the key distribution machine 400 (S210). The encryption key management unit 401 of the key distribution machine 400 sends the encryption key stored in the encryption key database 411 to the browsing machine 200, and the encryption key management unit 201 of the browsing machine 200 stores the received encryption key in the encryption key database 211 (S460).

The encrypted query generation unit 202 of the browsing machine 200 specifies a range and/or an item of the encrypted medical data (S220). Specifically, for example, the encrypted query generation unit 202 specifies a range and/or an item according to an input of the user of the browsing machine 200. In the example of FIG. 2A described above, the encrypted query generation unit 202 specifies items such as "birth date" and "days of hospitalization". In addition, the encrypted query generation unit 202 specifies a range of values such as, for example, days of hospitalization being "20 days or more" and birth date being "1970 or later".

The encrypted query generation unit 202 creates data requesting the items and range specified in step S220 and encrypts the data by using the encryption key sent in step S460 (S230). Details of the encrypted query generation processing will be described later with reference to FIGS. 8 and 9. Hereinafter, this request data is referred to as a query, and the encrypted query is referred to as an encrypted query. The encrypted query generation unit 202 sends the encrypted query created in step S240 to the management machine 300 (S240).

The data comparison unit 302 of the management machine 300 searches for the items specified in the encrypted query from the encrypted data stored in the ciphertext database 311 (S360). For example, in the example of FIG. 2A, when items such as "birth date" and "days of hospitalization" are specified, the data comparison unit 302 extracts encrypted data related to "birth date" and "days of hospitalization" as comparison targets of the encrypted query.

The data comparison unit 302 compares the encrypted data with the encrypted query in the medical data items specified by the encrypted query and extracts the encrypted data from the result (S370). For example, in the example of FIG. 2A, the data comparison unit 302 compares the encrypted data with the encrypted query that satisfies a condition that days of hospitalization is "20 days or more" or birth date is "1970 or later" and extracts encrypted data that satisfies the condition as in the example of FIG. 2C. Details of the data comparison processing will be described later with reference to FIGS. 10 and 11.

The data comparison unit 302 sends the extracted encrypted data to the browsing machine 200 (S380). The decryption processing unit 203 of the browsing machine 200 decrypts the sent encrypted data by using the encryption key sent in step S460 (S250). Through the above processing, the browsing machine 200 can obtain desired encrypted data without disclosing the plaintext of the medical data to the management machine 300.

The above-described processing procedure is merely an example, and the processing order and processing contents may be changed as necessary. For example, when the browsing machine 200 and the key distribution machine 400 belong to the same entity, some processing may be omitted, such as the browsing machine 200 having an encryption key in advance without the key distribution machine 400 sending the encryption key to the browsing machine 200.

FIG. 6 is a flowchart illustrating an example of the encrypted data generation processing in step S130. First, data is n-bit data and is expressed by a symbol ($m_n m_{n-1} \ldots m_1$). It is assumed that $m_n$ is the most significant bit and $m_1$ is the least significant bit. The value of each bit is 0 or 1. When the number of bits of the data is less than n bits, the encrypted data generation unit 102 converts the data into n-bit data by performing a predetermined padding operation in advance, for example.

The encrypted data generation unit 102 initializes the value of a variable i to n (S1300). The encrypted data generation unit 102 generates a random number r (for example, about 128 bits) (S1301). The encrypted data generation unit 102 extracts data from $m_n$ to $m_i$ (S1302).

The encrypted data generation unit 102 concatenates $m_n m_{n-1} \ldots m_i$ ($=m_i'$) with a secret key $sk_1$ received from the key distribution machine 400 in step S410 and obtains a hash value thereof (S1303). The processing from step S1302 to step S1309 is performed one or more times in a loop, but the same function is used as a hash function in step S1303 executed in each loop.

The encrypted data generation unit 102 concatenates the hash value obtained in step S1303 with the random number r and obtains a hash value thereof (S1304). The processing from step S1302 to step S1309 is performed one or more times in a loop, but the same function is used as a hash function in step S1304 executed in each loop. The hash functions used in step S1303 and step S1304 may be the same or different. The encrypted data generation unit 102 performs an xor operation of the hash value obtained in step S1304 and $m_i$ (that is, embeds the result of the magnitude comparison between the plaintext data and the plaintext query in the encrypted data in advance) and stores the calculation result (S1305).

To hide the relationship of bit position i in the plaintext of data $m_i$, the encrypted data generation unit 102 shuffles the position i of the value obtained in step S1305 by using, for example, a secret key $sk_2$ received from the key distribution machine 400 in step S410 (S1306). In the shuffle according to the present embodiment, positions after shuffle do not overlap.

Specifically, for example, the encrypted data generation unit 102 replaces the value of the variable i with a value of or more and n or less. This replacement may use a pseudo-random function using the secret key $sk_2$ as described above. Further, the encrypted data generation unit 102 may replace the value of the variable i by using a replacement table including two columns of values before and after the replacement of the variable i. In this case, the replacement table itself is the secret key $sk_2$. The encrypted data generation unit 102 stores the value of the replaced variable i in a variable j. The secret key $sk_1$ and the secret key $sk_2$ may be the same, but using different secret keys increases the security of the encrypted data.

The encrypted data generation unit 102 stores the output value in step S1305 as $c_j$ (S1307). The encrypted data generation unit 102 decreases the value of the variable i by 1 (S1308). The encrypted data generation unit 102 determines whether or not the value of the variable i after the decrement is less than 1 (S1309).

When the encrypted data generation unit 102 determines that the value of the variable i after the decrement is 1 or more (step S1309: No), the process returns to step S1301. If it is determined that the value of the variable i after the decrement is less than 1 (S1309: Yes), the encrypted data generation unit 102 outputs the random number r and the created n pieces of c as encrypted data ($rc_n c_{n-1} \ldots c_1$) (S1310) and ends the encrypted data generation processing.

Figure 7:
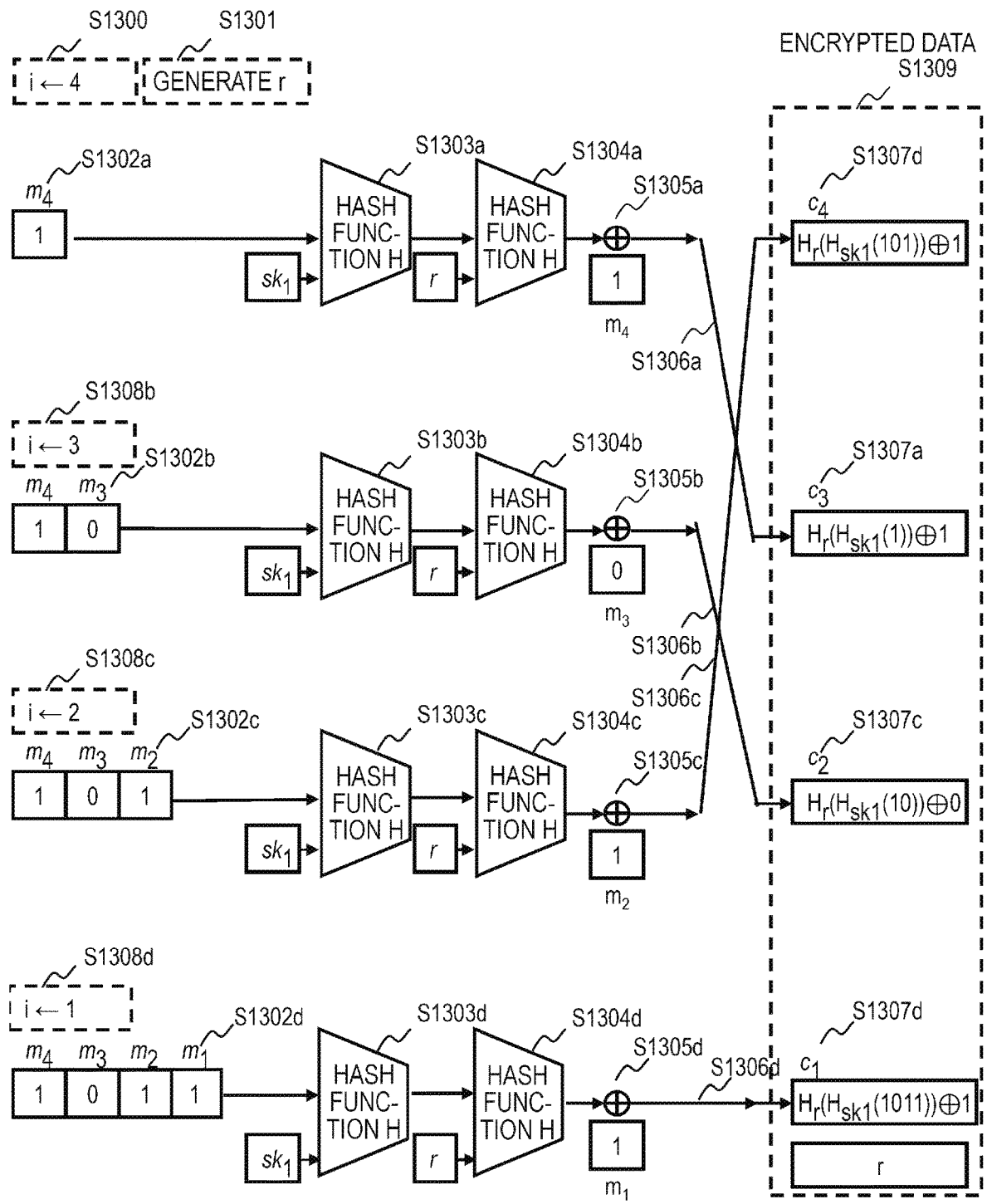
FIG. 7 is an explanatory diagram illustrating a specific example of encrypted data generation processing in Example 1.

FIG. 7 is an explanatory diagram illustrating a specific example of the encrypted data generation processing described in FIG. 6. An example of processing for generating encrypted data of base-10 integer 10 will be described. The base-10 integer 10 can be expressed by (1011) as 4-bit data. The secret key $sk_2$ used in the shuffling in step S1306 replaces 4 with 3, 3 with 2, 2 with 4, and 1 with 1.

Hereinafter, in a case where a plurality of times of loop processing are performed, for example, the first step S1302 is described as step S1302a, the second step S1302 is described as step S1302b, the third step S1302 is described as step S1302c, and the fourth step S1302 is described as step S1302d.

First, the encrypted data generation unit 102 initializes the variable i to 4 (S1300), and the encrypted data generation unit 102 generates a random number r (S1301). Hereinafter, the processing of steps S1302 to S1309 is executed in order from the most significant bit.

The encrypted data generation unit 102 extracts 1 as the value of $m_4$ from the data (S1302a). The encrypted data generation unit 102 concatenates the value 1 of $m_4$ with the secret key $sk_1$ and obtains a hash value $H_{sk1}(1)$ (S1303a). The encrypted data generation unit 102 concatenates the hash value $H_{sk1}(1)$ obtained in step S1303 with the random number r and obtains a hash value $H_r(H_{sk1}(1))$ thereof (S1304a).

The encrypted data generation unit 102 performs an xor operation of the hash value obtained in step S1304a and the value 1 of $m_4$ and obtains $H_r(H_{sk1}(1)) \oplus 1$ (S1305a). The encrypted data generation unit 102 replaces the value of the variable i from 4 to 3 and stores the value as the variable j (S1306a). The encrypted data generation unit 102 stores the value obtained in step S1305a as $c_3$ (S1307a). The encrypted data generation unit 102 decreases the value of the variable i by 1 from 4 to 3 (S1308a). Since the value after the decrement is 1 or more, the process shifts to S1302b (S1308).

The encrypted data generation unit 102 extracts 1 as the value of $m_4$ and 0 as the value of $m_3$ from the data (S1302b). The encrypted data generation unit 102 concatenates the value 1 of $m_4$, the value 0 of $m_3$ with the secret key $sk_1$ and obtains a hash value $H_{sk1}(10)$ thereof (S1303b). The encrypted data generation unit 102 concatenates the hash value $H_{sk1}(10)$ obtained in step S1303 with the random number r and obtains a hash value $H_r(H_{sk1}(10))$ (S1304b).

The encrypted data generation unit 102 performs an xor operation of the hash value obtained in step S1304b and the value 0 of $m_3$ and obtains $H_r(H_{sk1}(10)) \oplus 0 = H_r(H_{sk1}(10))$ (S1305b). The encrypted data generation unit 102 replaces the value of the variable i from 3 to 2 and stores the value as the variable j (S1306b). The encrypted data generation unit 102 stores the value obtained in step S1305a as $c_2$ (S1307b). The encrypted data generation unit 102 decreases the value of the variable i by 1 from 3 to 2 (S1308b). Since the value after the decrement is 1 or more, the process shifts to S1302c.

The encrypted data generating unit 102 extracts 1 as the value of $m_4$, 0 as the value of $m_3$, and 1 as the value of $m_2$ from the data (S1302c). The encrypted data generation unit 102 concatenates the value 1 of $m_4$, the value 0 of $m_3$, and the value 1 of $m_2$ with the secret key $sk_1$ and obtains a hash value $H_{sk1}(101)$ (S1303c). The encrypted data generation unit 102 concatenates the hash value $H_{sk1}$ (101) obtained in step S1303 with the random number r and obtains a hash value $H_r(H_{sk1}$ (101)) (S1304c).

The encrypted data generation unit 102 performs an xor operation of the hash value obtained in step S1304c and the value 1 of $m_2$ and obtains $H_r (H_{sk1}$ (101))⊕1 (S1305c). The encrypted data generation unit 102 replaces the value of the variable i from 2 to 4 and stores the value as the variable j (S1306c). The encrypted data generation unit 102 stores the value obtained in step S1305a as $c_4$ (S1307c). The encrypted data generation unit 102 decreases the value of the variable i by 1 from 2 to 1 (S1308c). Since the value after the decrement is 1 or more, the process proceeds to S1302b.

The encrypted data generation unit 102 extracts 1 as the value of $m_4$, 0 as the value of $m_3$, 1 as the value of $m_2$, and 1 as the value of $m_i$ from the data (S1302d). The encrypted data generation unit 102 concatenates the value 1 of $m_4$, the value 0 of $m_3$, the value 1 of $m_2$, and the value 1 of $m_1$ with the secret key hk and obtains a hash value $H_{sk1}$ (1011) thereof (S1303d). The encrypted data generation unit 102 concatenates the hash value $H_{sk1}$ (1011) obtained in step S1303 with the random number r and obtains a hash value $H_r (H_{sk1}$ (1011)) (S1304d).

The encrypted data generation unit 102 performs an xor operation of the hash value obtained in step S1304d and the value 1 of $m_i$ and obtains $H_r (H_{sk1}$ (1011))⊕1 (S1305d). The encrypted data generation unit 102 replaces the value of the variable i from 1 to 1 and stores the value as the variable j (S1306d). The encrypted data generation unit 102 stores the value obtained in step S1305a as $c_1$ (S1307d).

The encrypted data generation unit 102 decreases the value of the variable i by 1 from 1 to 0. Since the value after the decrement is less than 1, the process proceeds to step S1309. The encrypted data generation unit 102 outputs ($rc_4c_3c_2c_1$) as encrypted data (S1310).

Figure 8:
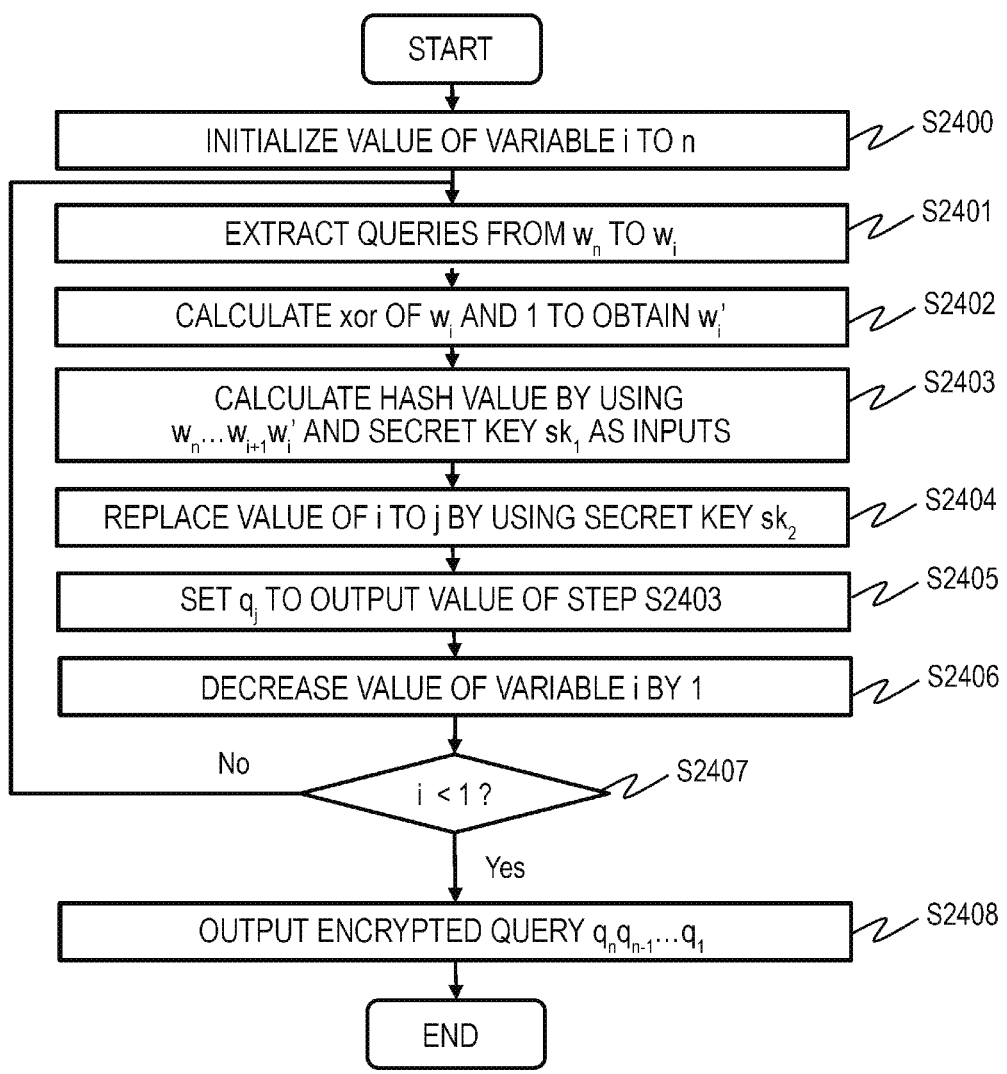
FIG. 8 is a flowchart illustrating an example of encrypted query generation processing in Example 1.

FIG. 8 is a flowchart illustrating an example of the encrypted query generation processing in step S230. The query is n-bit data, and is expressed by a symbol ($w_n w_{n-1} \ldots w_1$). It is assumed that $w_n$ is the most significant bit and $w_1$ is the least significant bit. The value of each bit is 0 or 1. When the number of bits of the query is less than n bits, the encrypted query generation unit 202 converts the data into n-bit data by performing a predetermined padding operation in advance, for example.

The encrypted query generation unit 202 initializes the value of the variable i to n (S2400). The encrypted query generation unit 202 extracts the query from $w_n$ to $w_1$ (S2401). The encrypted query generation unit 202 calculates $w_i$ xor 1 (that is, the bit is inverted and changes to a value different from the original $w_1$) and stores the calculated value as $w_1'$ (S2402).

The encrypted query generation unit 202 concatenates $w_n w_{n-1} \ldots w_i+1 w_i'$ with the secret key $sk_1$ received from the key distribution machine 400 in step S460 and obtains a hash value thereof (S2403). The secret keys used in step S1303 and step S2403 are the same. The hash function used in step S2403 is the same as the hash function used in step S1303.

To hide the relationship of bit position i in the plaintext of data $w_i$, the encrypted query generation unit 202 shuffles the position i of the value obtained in step S2403 by using, for example, the secret key $sk_2$ received from the key distribution machine 400 in step S460 (S2404). Then, the encrypted query generation unit 202 stores the value of the replaced variable i in the variable j. The method of shuffling in step S2403 and the secret key used for shuffling are the same as in step S1306.

The encrypted query generation unit 202 stores the hash value obtained in step S2403 as q (S2405). The encrypted query generation unit 202 decreases the value of the variable i by 1 (S2406). The encrypted query generation unit 202 determines whether or not the value of the variable i after the decrement is 1 or less (S2407).

When it is determined that the value after the decrement is 1 or more (S2407: No), the encrypted query generation unit 202 returns to step S2401. When it is determined that the value after the decrement is less than 1 (S2407: Yes), the encrypted query generation unit 202 outputs the created n pieces of $q_j$ as encrypted queries ($q_n q_{n-1} \ldots q_1$) (S2408) and ends the encrypted query generation processing.

Figure 9:
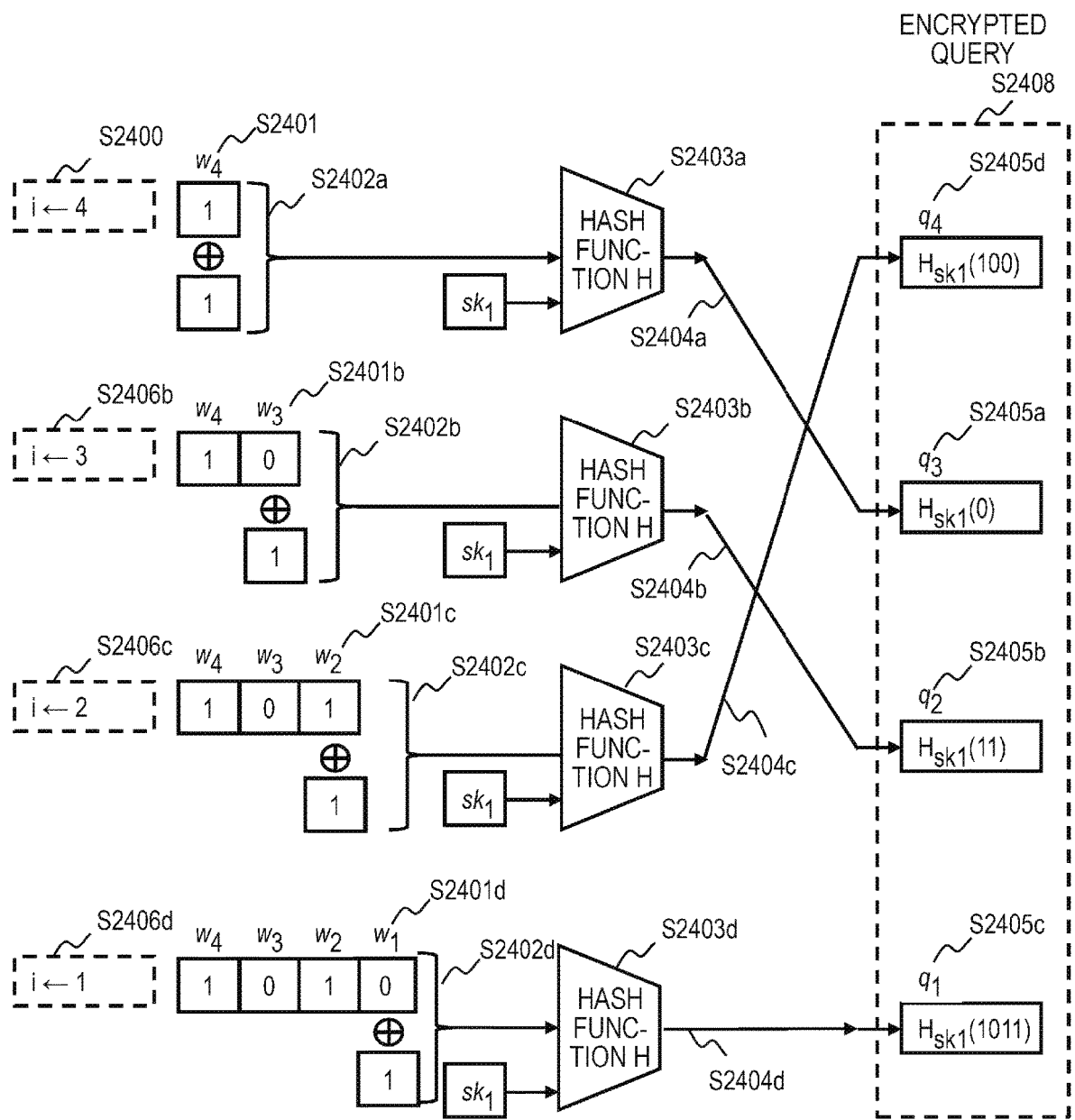
FIG. 9 is an explanatory diagram illustrating a specific example of encrypted query generation processing in Example 1.

FIG. 9 is an explanatory diagram illustrating a specific example of the encrypted query generation processing described in FIG. 8. An example of processing of creating an encrypted query with base-10 integer 10 will be described. The base-10 integer 10 can be expressed as (1010) as a 4-bit query.

The secret key $sk_2$ used in the shuffling in step S2404 replaces 4 with 3, 3 with 2, 2 with 4, and 1 with 1. First, the encrypted query generation unit 202 initializes a variable i to 4 (S2400). Hereinafter, the processing of steps S2401 to S2407 is executed in order from the most significant bit.

The encrypted query generation unit 202 extracts 1 as the value of $w_4$ from the query (S2401a). The encrypted query generation unit 202 calculates $w_4$ xor 1 (=0) and stores 0 as $w_4'$ (S2402a). The encrypted query generation unit 202 concatenates the value 0 of $w_4'$ with the secret key $sk_1$ and obtains a hash value $H_{sk1}$ (0) thereof (S2403a).

The encrypted query generation unit 202 replaces the value of the variable i from 4 to 3 and stores the value as the variable j (S2404a). The encrypted query generation unit 202 stores the hash value $H_{sk1}$ (0) obtained in step S2403a as $q_3$ (S2405a). The encrypted query generation unit 202 decreases the value of the variable i by 1 from 4 (S2406a) to 3. Since the value after the decrement is 1 or more, the process shifts to step S2401b.

The encrypted query generation unit 202 extracts 1 as the value of $w_4$ and 0 as the value of $w_3$ from the query (S2401b). The encrypted query generation unit 202 calculates $w_3$ xor 1 (=1) and stores 1 as $w_3'$ (S2402b). The encrypted query generation unit 202 concatenates the value 11 of $w_4 w_3'$ with the secret key $sk_1$ and obtains a hash value $H_{sk1}$ (11) thereof (S2403b). The encrypted query generation unit 202 replaces the value of the variable i from 3 to 2 and stores the value as the variable j (S2404b).

The encrypted query generation unit 202 stores the hash value $H_{sk1}$ (11) obtained in step S2403b as $q_2$ (S2405b). The encrypted query generation unit 202 decreases the value of the variable i by 1 from 3 to 2 (S2406c). Since the value after the decrement is 1 or more, the process shifts to step S2401c.

The encrypted query generation unit 202 extracts 1 as the value of $w_4$, 0 as the value of $w_3$, and 1 as the value of $w_2$ from the query (S2401c). The encrypted query generation unit 202 calculates $w_2$ xor 1 (=0) and stores 0 as $w_2'$ (S2402c). The encrypted query generation unit 202 concatenates the value 100 of $w_4 w_3 w_2'$ with the secret key $sk_1$ and obtains a hash value $H_{sk1}$ (100) thereof (S2403c). The encrypted query generation unit 202 replaces the value of the variable i from 2 to 4 and stores the value as the variable j (S2404c).

The encrypted query generation unit 202 stores the hash value $H_{sk1}$ (100) obtained in step S2404c as $q_4$ (S2405c). The encrypted query generation unit 202 decreases the value of the variable i by 1 from 2 to 1 (S2406c). Since the value after the decrement is 1 or more, the process shifts to step S2401d. The encrypted query generation unit 202 extracts 1 as the value of $w_4$, 0 as the value of $w_3$, 1 as the value of $w_2$, and 0 as the value of $w_1$ from the query (S2401d).

The encrypted query generation unit 202 calculates $w_i$ xor 1 (=1) and stores 1 as $w_i'$ (S2402d). The encrypted query generation unit 202 concatenates the value 1011 of $w_4w_3w_2w_1'$ with the secret key hk and obtains a hash value $H_{sk1}$ (1011) thereof (S2403d). The encrypted query generation unit 202 replaces the value of the variable i from 1 to 1 and stores the value as the variable j (S2404d).

The encrypted query generation unit 202 stores the hash value $H_{sk1}$ (1011) obtained in step S2404d as $q_1$ (S2405d). The encrypted query generation unit 202 decreases the value of the variable i by 1 from 1 to 0. Since the value after the decrement is less than 1, the encrypted query generation unit 202 outputs $q_4q_3q_2q_1$ as the encrypted query (S2407a).

Figure 10:
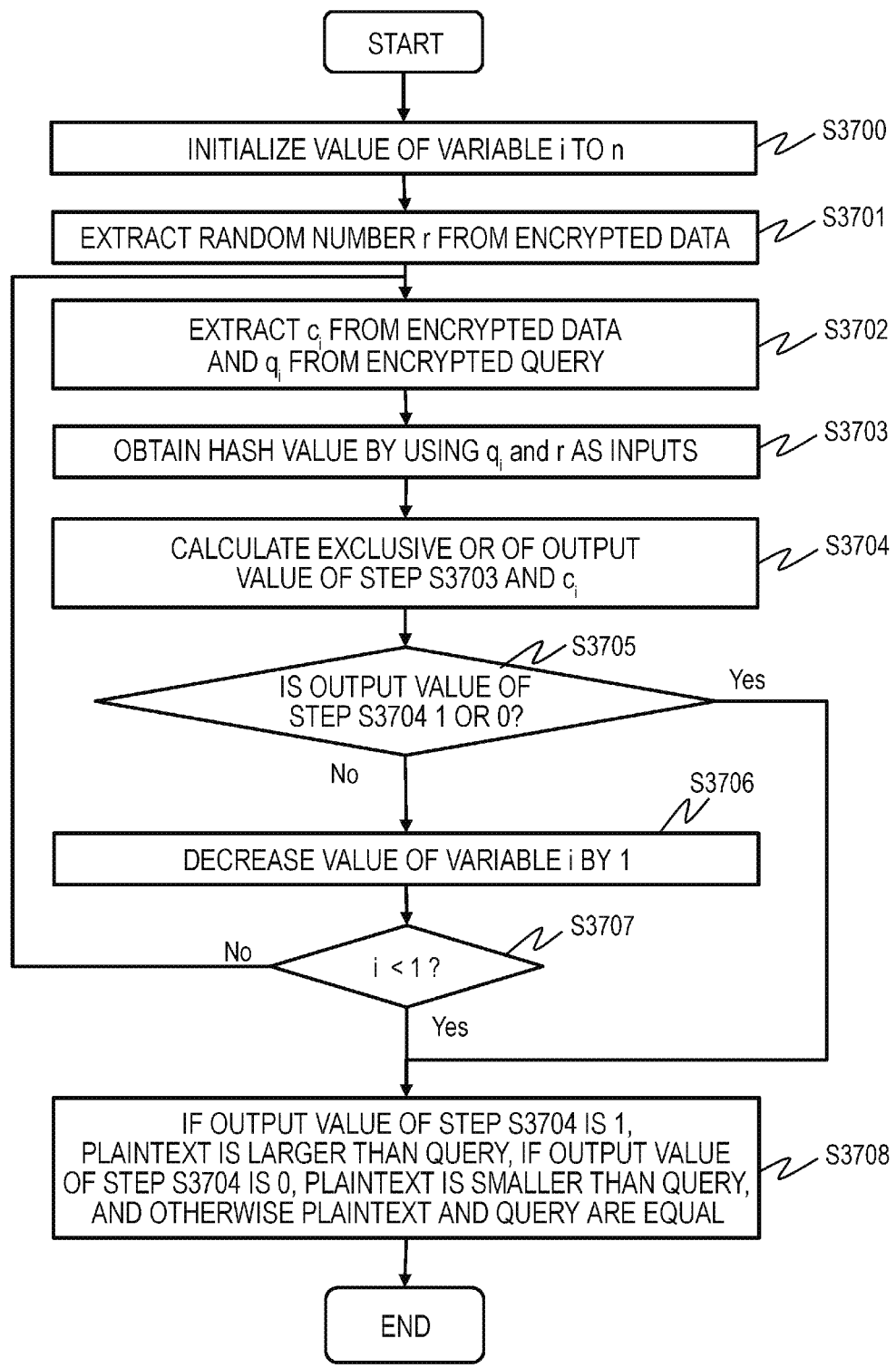
FIG. 10 is a flowchart illustrating an example of comparison processing between encrypted data and an encrypted query in Example 1.

FIG. 10 is a flowchart illustrating an example of the comparison processing between the encrypted data and the encrypted query in step S370. The data comparison unit 302 initializes the value of the variable i to n (S3700). The data comparison unit 302 extracts the random number r from the encrypted data (S3701). The data comparison unit 302 extracts $c_i$ from the encrypted data and $q_i$ from the encrypted query (S3702).

The data comparison unit 302 concatenates $q_i$ with the random number r and obtains a hash value $H_r$ ($q_i$) thereof (S3703). The data comparison unit 302 regards the hash value obtained in step S1305 as an integer and obtains an exclusive OR of the integer and $c_i$ (S3704). The hash function used in step S3704 is the same as the hash function used in step S1304.

The data comparison unit 302 determines whether the value obtained in step S3074 is 1 or 0 (S3075). When it is determined whether the value obtained in step S3074 is 1 or 0 (S3075: Yes), the data comparison unit 302 outputs a comparison processing result according to the value obtained in step S3704 (S3708) and ends the data comparison processing.

When it is determined that the value obtained in step S3074 is neither 1 nor 0 (S3705: No), the data comparison unit 302 decreases the value of the variable i by 1 (S3706). The data comparison unit 302 determines whether the value of the variable i after the decrement is less than 1 (S3707). When it is determined that the value of the variable i after the decrement is 1 or more (S3706: No), the data comparison unit 302 returns to step S3702. When it is determined that the value of the variable i after the decrement is less than 1 (S3706: Yes), the data comparison unit 302 executes the processing of step S3708 and ends the data comparison processing.

In step S3708, the data comparison unit 302 determines that the plaintext is larger than the query if the value obtained in step S3704 is 1, determines that the plaintext is smaller than the query if the value is 0, and determines that the plaintext is equal to the query if the value is any other value (that is, a random number appears).

Figure 11:
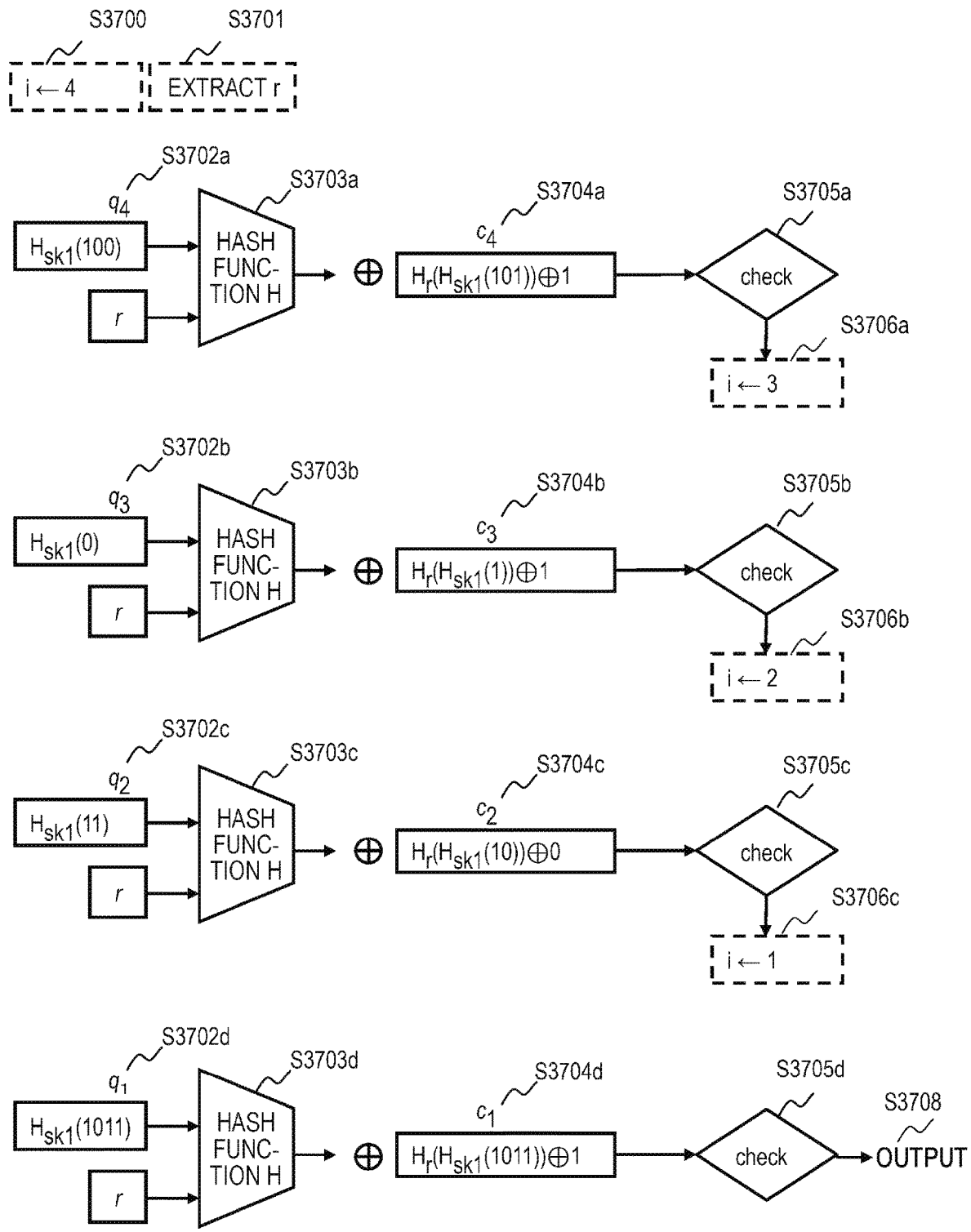
FIG. 11 is an explanatory diagram illustrating a specific example of comparison processing between encrypted data and an encrypted query in Example 1.

FIG. 11 is an explanatory diagram illustrating a specific example of the comparison processing between the encrypted data and the encrypted query described in FIG. 10. FIG. 7 illustrates the encryption processing of the data (1011), and FIG. 9 illustrates the encryption processing of the query (1010). FIG. 11 illustrates an example of processing of comparing the encrypted data and the encrypted query, and since 1011>1010, in the example of FIG. 11, a comparison result that is finally determined that the data is larger than the query is output.

First, the data comparison unit 302 initializes the variable i to 4 (S3700). The data comparison unit 302 extracts the random number r from the encrypted data (S3701). Hereinafter, the processing of steps S3701 to S3707 is executed in order from the most significant bit.

The data comparison unit 302 extracts $q_4$ from the encrypted query (S3702a). $q_4$ is the hash value $H_{sk1}$ (100). The data comparison unit 302 concatenates the value $H_{sk1}$ (100) of $q_4$ with the random number r and obtains a hash value $H_r$ ($H_{sk1}$ (100)) thereof (S3703a).

The data comparison unit 302 extracts $c_4$ from the encrypted data and performs an xor operation of the value $H_r$ ($H_{sk1}$ (101))⊕1 and the hash value $H_r$ ($H_{sk1}$ (100)) obtained in step S3703a (S3704a). Here, as for the hash value of the value (101) and the hash value of the value (100), since the possibility of duplicate values can be ignored as long as an appropriate hash function is used, a random number obtained by performing an xor operation of two different hash values is output as a result of the xor operation.

Therefore, the data comparison unit 302 determines that the value output in step S3704a is neither 1 nor 0 (S3705a). The data comparison unit 302 reduces the value of the variable i by 1 from 4 (S3706a) to 3. Since the value after the decrement is 1 or more, the process shifts to S3702b.

The data comparison unit 302 extracts $q_3$ from the encrypted query (S3702b). $q_3$ is the hash value $H_{sk1}$ (0). The data comparison unit 302 concatenates the value $H_{sk1}$ (0) of $q_3$ with the random number r and obtains a hash value $H_r$ ($H_{sk1}$ (0)) thereof (S3703b).

The data comparison unit 302 extracts $c_3$ from the encrypted data and performs an xor operation of the value $H_r$ ($H_{sk1}$ (1))⊕1 and the hash value $H_r$ ($H_{sk1}$ (0)) obtained in step S3703b (S3704b). Since the values input to the hash function differ between (0) and (1), this xor operation will output a random number as long as an appropriate hash function is used.

Therefore, the data comparison unit 302 determines that the value output in step S3704b is neither 1 nor 0 (S3705b). The data comparison unit 302 decreases the value of the variable i by 1 from 3 (S3706b) to 2. Since the value after the decrement is 1 or more, the process shifts to step S3702c.

The data comparison unit 302 extracts $q_2$ from the encrypted query (S3702c). $q_2$ is a hash value $H_{sk1}$ (11). The data comparison unit 302 concatenates the value $H_{sk1}$ (11) of $q_2$ with the random number r and obtains a hash value $H_r$ ($H_{sk1}$ (11)) thereof (S3703b).

The data comparison unit 302 extracts $c_2$ from the encrypted data and performs an xor operation of the value $H_r$($H_{sk1}$ (10)) and the hash value $H_r$($H_{sk1}$ (11)) obtained in step S3703c (S3704c). Since the values input to the hash function differ between (10) and (11), this xor operation will output a random number as long as an appropriate hash function is used.

Therefore, the data comparison unit 302 determines that the value output in step S3704c is neither 1 nor 0 (S3705c). The data comparison unit 302 decreases the value of the variable i by 1 from 2 to 1 (S3706c). Since the value after the decrement is 1 or more, the process shifts to step S3702d.

The data comparison unit 302 extracts $q_1$ from the encrypted query (S3702d). $q_1$ is a hash value $H_{sk1}$ (1011). The data comparison unit 302 concatenates the value $H_{sk1}$ (1011) of $q_1$ with the random number r and obtains a hash value $H_r$ ($H_{sk1}$ (1011)) thereof (S3703b).

The data comparison unit 302 extracts $c_1$ from the encrypted data and performs an xor operation of the value $H_r$ ($H_{sk1}$ (1011))⊕1 and the hash value $H_r$ ($H_{sk1}$ (11)) obtained in step S3703b (S3704d). Since the value input to the hash function is equal at (1011) and (1011), the hash value is also the same, and 1 is output in this xor operation.

Since the value output in step S3704d is 1, the data comparison unit 302 proceeds to step S3708 (S3705d). Since the value output in step S3704d is 1, the data comparison unit 302 outputs a comparison result indicating that the encrypted data is larger than the encrypted query (S3708).

As described above, the data comparison unit 302 can obtain a magnitude relationship that the data (1011) is larger than the query (1010) by comparing the encrypted data and the encrypted query with the data encrypted.

As illustrated in this example, in the present example, the magnitude comparison is performed in 1-bit units in step S3705, a random number is output in step S3704 until the magnitude is determined, and when 1 or 0 appears, the magnitude comparison result is determined. Therefore, the data comparison unit 302 can obtain the result of the magnitude comparison while hiding the similarity between the encrypted data and the original value of the encrypted query.

Further, since the encrypted data comparison system of the present embodiment shuffles the bit positions and performs the encryption, it is possible to hide which block (such as $C_4$ or $C_3$) of the encrypted data corresponds to which bit position (upper bit or lower bit) of the original data.

In the above-described example, the data comparison unit 302 compares the encrypted data with the encrypted query in order from the most significant bit, but the comparison may be performed from any bit.

Further, in the above-described example, a shuffle (that is, the same replacement) is performed by using the same secret key $sk_2$ in the encrypted data generation and the encrypted query generation, but the encrypted query generation unit 202 does not need to execute the shuffle using the secret key $sk_2$. In this case, for example, the encrypted query generation unit 202 generates encrypted queries of all shuffle patterns, and the data comparison unit 302 can compare the same digit value of the encrypted data with the encrypted query by comparing the encrypted data with each of the encrypted query data of all shuffle patterns.

Further, in such a case, the encrypted data generation unit 102 may perform shuffling without using a secret key. Specifically, for example, the encrypted data generation unit 102 may execute a shuffling such that the higher the bit of the hash value output in step S1304, the higher the bit.

Example 2

Example 1 indicates that, in the magnitude comparison in 1-bit units, a comparison result is embedded in the encrypted data in advance, a random number is output without outputting the comparison result until the magnitude is determined, and by outputting the comparison result (1 or 0) only when the magnitude is determined, only the comparison result is output while hiding the similarity between the encrypted data and the original value of the encrypted query.

Example 2 indicates that even if the data is encrypted with more than 1 bit, a comparison result can be evaluated, and then, instead of embedding the comparison result in the encrypted data, even if the comparison result is embedded in the encrypted query, only the comparison result is output while hiding the similarity between the encrypted data and the original value of the encrypted query.

The method of Example 2 does not limit the number of bits of data to be encrypted, but for the sake of simplicity, a specific example will be described in which data is encrypted with a base-3 number of 0, 1, and 2, instead of a base-2 number of 0 and 1 that can be expressed by 1 bit. The configuration example of the encrypted data comparison and determination system and each device included in the encrypted data comparison and determination system of Example 2 is the same as that of Example 1. Hereinafter, processing different from Example 1 will be described.

Figure 12:
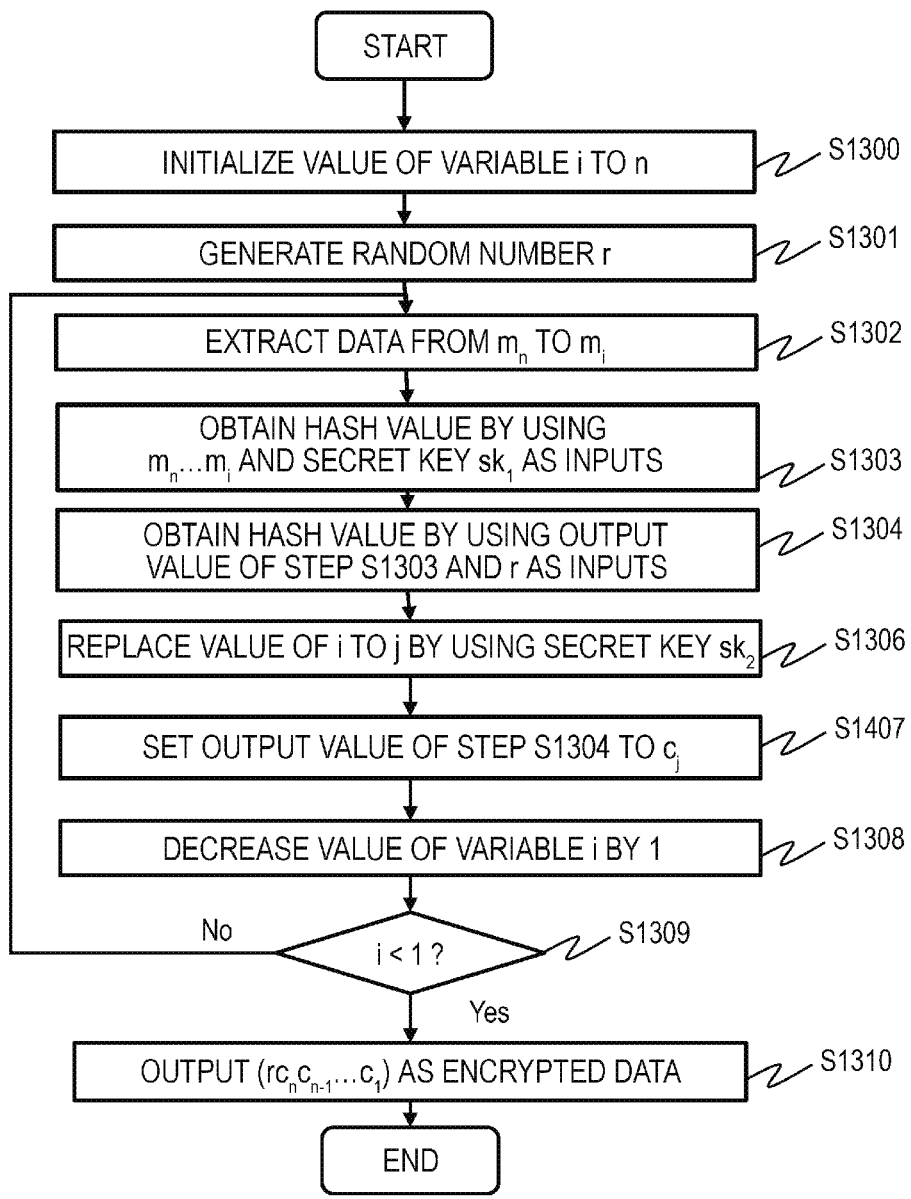
FIG. 12 is a flowchart illustrating an example of encrypted data generation processing in Example 2.

FIG. 12 is a flowchart illustrating an example of the encrypted data generation processing in step S130. In the present example, data is expressed by n pieces of base-3 numbers and expressed by a symbol $(m_n m_{n-1} \ldots m_i)$. $m_n$ is the uppermost block, $m_i$ is the lowermost block, and the value of each block is 0, 1, or 2.

The data encryption processing in FIG. 12 is the same as the data encryption processing (FIG. 6) in Example 1, except for the following points. In the data encryption processing of the present example, the processing of step S1305 (embedding of the comparison result in the encrypted data) is not performed. Further, instead of the processing in step S1307, the encrypted data generation unit 102 executes processing for storing the hash value obtained in step S1304 as $c_j$ (S1407).

Figure 13:
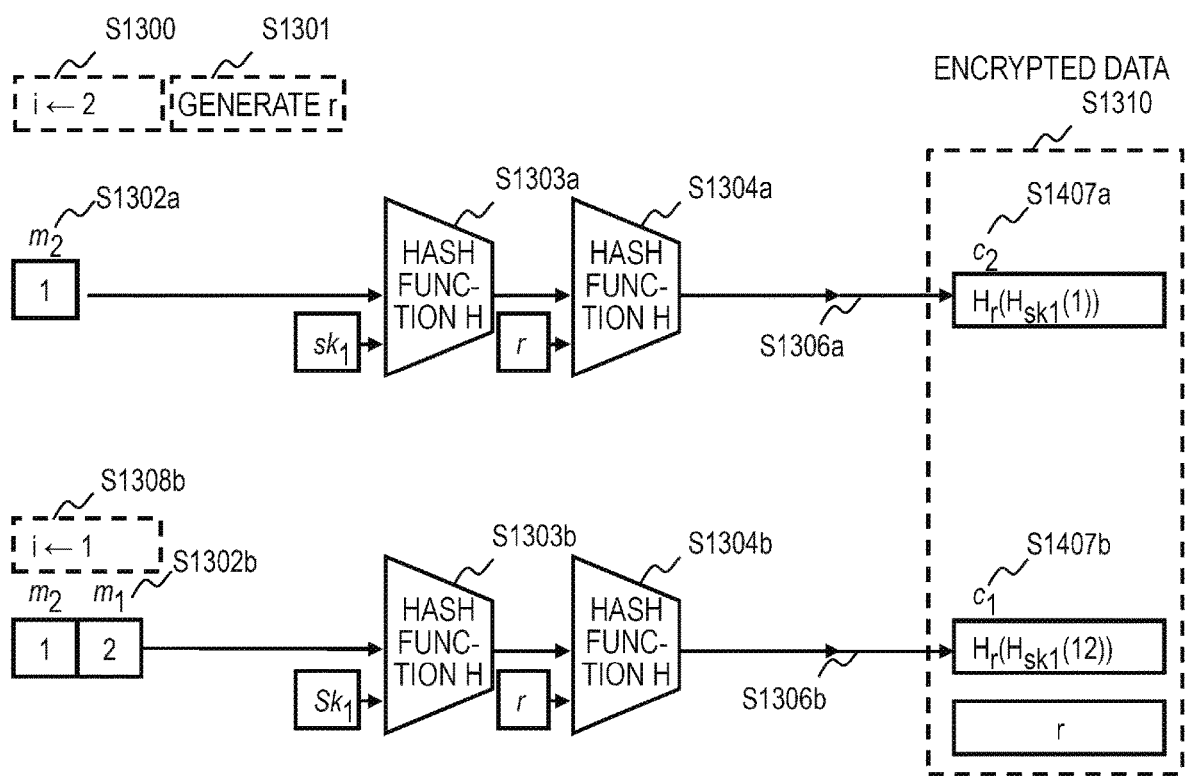
FIG. 13 is an explanatory diagram illustrating a specific example of encrypted data generation processing in Embodiment 2.

FIG. 13 is an explanatory diagram illustrating a specific example of the encrypted data generation processing. Processing of generating the encrypted data of a base-10 integer 5 will be described. When a base-3 number is used, the base-10 integer 5 can be expressed by two blocks of data (12).

The encrypted data generation unit 102 initializes the variable i to the number of blocks of 2 (S1300a). The encrypted data generation unit 102 generates a random number r (S1301a). The encrypted data generation unit 102 extracts 1 as the value of $m_2$ from the data (S1302a). The encrypted data generation unit 102 concatenates the value 1 of $m_2$ with the secret key $sk_1$ and obtains a hash value $H_{sk1}(1)$ (S1303a).

The encrypted data generation unit 102 concatenates the hash value $H_{sk1}(1)$ obtained in step S1303 with the random number r and obtains a hash value $H_r(H_{sk1}(1))$ thereof (S1304a). The encrypted data generation unit 102 replaces the value 2 of the variable i with a value of 1 or more and less than 3 (that is, 1 or 2) and stores the value in the variable j (S1306a). In the example of FIG. 13, the value 2 of the variable i is replaced by 2 (which happens to be the same value) by the secret key $sk_2$.

The encrypted data generation unit 102 stores the value obtained in step S1304a as $c_1$ (S1407a). The encrypted data generation unit 102 decreases the value of the variable i from 2 to 1 to 1 (S1308a). Since the value after the decrement is 1 or more, the process shifts to step S1302b.

The encrypted data generation unit 102 extracts 1 as the value of $m_2$ and 2 as the value of $m_1$ from the data (S1302b). The encrypted data generation unit 102 concatenates the value 1 of $m_2$ and the value 2 of $m_i$ with the secret key $sk_1$ and obtains a hash value $H_{sk1}(10)$ thereof (S1303b).

The encrypted data generation unit 102 concatenates the hash value $H_{sk1}(12)$ obtained in S1303 with the random number r and obtains a hash value $H_r(H_{sk1}(12))$ thereof (S1304b). The encrypted data generation unit 102 replaces the value of the variable i from 1 to a value of 1 or more and less than 3 (that is, 1 or 2) and stores the value in the variable j (S1306b). In the example of FIG. 13, the value of the variable i is stored from 1 to 1 (which happens to be the same value) by the secret key $sk_2$ and stored as the variable j.

The encrypted data generation unit 102 stores the value obtained in step S1304b as $c_2$ (S1407b). The encrypted data generation unit 102 decreases the value of the variable i by 1 from 2 to 0. Since the value after the decrement is less than 1, the encrypted data generation unit 102 outputs ($rc_2c_1$) as encrypted data (S1309).

Figure 14:
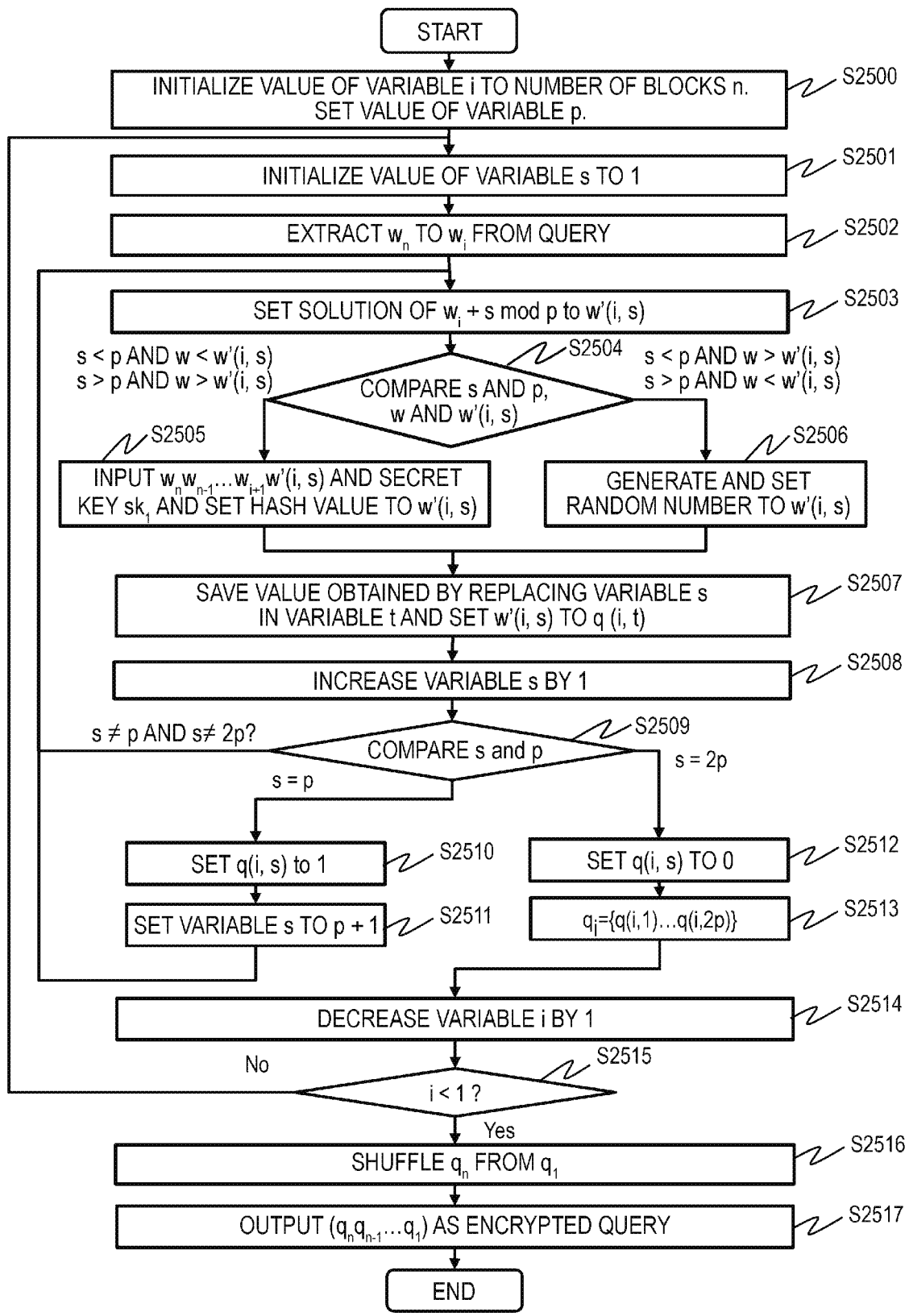
FIG. 14 is a flowchart illustrating an example of encrypted query generation processing in Example 2.

FIG. 14 is a flowchart illustrating an example of the encrypted query generation processing in step S230. First, a query is base-p data of n blocks and is expressed by a symbol ($w_n w_{n-1} \ldots w_1$). It is assumed that $w_n$ is the top block and $w_1$ is the bottom block. The value of each block is 0, 1, 2, ... or (p−1).

The encrypted query generation unit 202 initializes the value of the variable i to n (S2500). The encrypted query generation unit 202 initializes the value of the variable s to 1 (S2501). The encrypted query generation unit 202 extracts from $w_n$ to $w_i$ of the query (S2502). The encrypted query generation unit 202 calculates $w_i$+s (mod p) and stores the result as w' (i, s) (that is, converts $w_i$ into a different value) (S2503).

The encrypted query generation unit 202 regards s and p, and $w_i$ and w' (i, s) as integers and compares the magnitude therebetween (S2504). When the encrypted query generation unit 202 determines in step S2504 that s<p and $w_i$<(i, s), or s>p and $w_i$>(i, s), the encrypted query generation unit 202 concatenates $w_n \ldots w_{i+1}$w'(i, s) with the secret key $sk_1$, stores a hash value thereof as new w' (i, s) (S2505), and proceeds to step S2507.

When it is determined in step S2504 that s<p and $w_i$>(i, s) or s>p and $w_i$<(i, s), the encrypted query generation unit 202 generates a random number, stores the generated random number as new w' (i, s) (S2506), and proceeds to step S2507.

If the variable s is 1 or more and less than p, the encrypted query generation unit 202 stores a value obtained by replacing the variable s with an integer value of 1 or more and less than p in a variable t, and if the variable s is equal to or more than p+1 and less than 2p, the encrypted query generation unit 202 stores the value obtained by replacing the variable s with an integer value equal to or more than (p+1) and less than 2p in the variable t (S2507). At this time, the encrypted query generation unit 202 stores the value of w' (i, s) in q(i, t).

The encrypted query generation unit 202 increases the value of the variable s by 1 (S2508). The encrypted query generation unit 202 compares the value of the variable s with p (S2509). When it is determined in step S2509 that the value of the variable s is not p and is not 2p, the encrypted query generation unit 202 returns to step S2503.

When the encrypted query generation unit 202 determines in step S2509 that the value of the variables is p, the encrypted query generation unit 202 sets the value of q(i, s) to 1 (embeds the plaintext value of the query as a magnitude comparison result) (S2510), sets the variable s to p+1 (S2511), and returns to step S2503.

When it is determined in step S2509 that the value of the variable s is 2p, the encrypted query generation unit 202 sets the value of q(i, s) to 0 (embeds the plaintext value of the query as a magnitude comparison result) (S2512), collectively sets q(i, 1), q(i, 2), ... q (i, 2p) into an encrypted query $q_i$ (S2513), and proceeds to step S2514.

The encrypted query generation unit 202 decreases the value of the variable i by 1 (S2514). The encrypted query generation unit 202 determines whether i is less than 1 (S2515). When it is determined that i is 1 or more (S2515: No), the encrypted query generation unit 202 returns to step S2501.

When it is determined that i is less than 1 (S2515: Yes), the encrypted query generation unit 202 shuffles each block of the encrypted queries $q_1 \ldots q_n$ in order to hide the relationship of the block position i of the data $w_i$ (S2516). The encrypted query generation processing ends. The replacement method is the same as in Example 1, for example. The encrypted query generation unit 202 outputs ($q_n q_{n-1} \ldots q_1$) as the encrypted queries (S2517) and ends the encrypted query generation processing.

Figure 15:
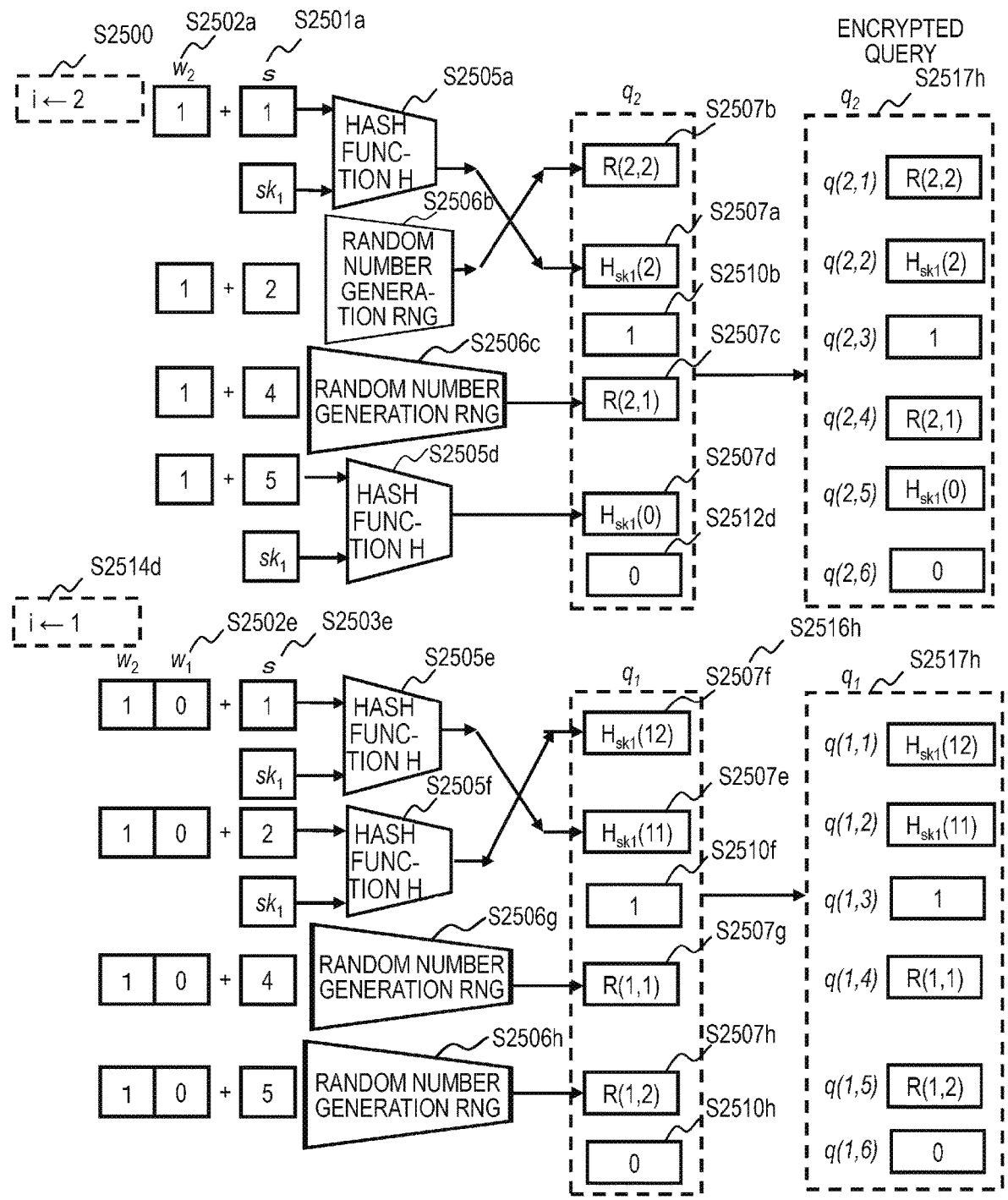
FIG. 15 is a flowchart illustrating a specific example of encrypted query generation processing in Example 2.

FIG. 15 is an explanatory diagram illustrating a specific example of the encrypted query generation processing. An example of processing for generating an encrypted query of integer 3 will be described. When a base-3 number is used, the integer 3 is expressed by two blocks of data (10).

First, a query is base-3 data of n blocks, and is expressed by a symbol ($w_n, w_{n-1}, \ldots w_i$). It is assumed that $w_n$ is the top block and $w_1$ is the bottom block. Each block has a value of 0 or 1 or 2.

The encrypted query generation unit 202 initializes the variable i to 2 as the number of blocks. Also, the value of p is set to 3 (S2500). The encrypted query generation unit 202 initializes the variable s to 1 (S2501a). The encrypted query generation unit 202 extracts the value 1 of the block $w_2$ (S2502a). The encrypted query generation unit 202 calculates $w_i$+s=1+1 (mod 3) and stores the solution 2 as w' (2, 1) (S2503a).

The encrypted query generation unit 202 regards s and p, and $w_2$ and w' (2, 1) as integers and compares the magnitude therebetween (s2504a). Since the value of s is 2 and the value of p is 3, s<p holds. Since $w_2$=1 and w' (2, 1)=2, $w_2$<w' (2, 1) holds. Therefore, the process proceeds to step S2505a.

The encrypted query generation unit 202 concatenates the value 2 of w' (2, 1) with the secret key $sk_1$, stores a hash value $H_{sk1}$ (2) thereof as new w' (2, 1) (S2505a), and proceeds to step S2507a. Since the variable s is 1, the encrypted query generation unit 202 replaces the variable s with an integer value of 1 or more and less than 3, stores the value 2 obtained by replacing the value 1 of the variable s in the variable t, and sets w' (2, 1) to q(2, 2) (S2507a). The encrypted query generation unit 202 increases the value 1 of the variable s by 1 to 2 (S2508a). Since 2≠3, s≠p, s≠2p, and the process shifts to S2503b.

The encrypted query generation unit 202 calculates $w_i$+s=1+2 (mod 3) and stores the solution 0 as w' (2, 2) (S2503b). The encrypted query generation unit 202 regards s and p, and $w_2$ and w' (2, 2) as integers and compares the magnitude therebetween (s2504b). Since the value of s is 2 and the value of p is 3, s<p holds. Since $w_2$=1 and w' (2, 2)=0, $w_2$>w' (2, 1) holds. Therefore, the process proceeds to S2506b.

The encrypted query generation unit 202 generates a random number, stores the generated random number as new w' (2, 2) (S2506b), and proceeds to step S2507b. Since variable s is 2, the encrypted query generation unit 202 replaces the variable s with an integer value of 1 or more and less than 3, further stores a value 1 obtained by replacing the value 2 of the variable s in the variable t, and sets w' (2, 2) to q(2, 1) (S2507b).

The encrypted query generation unit 202 increases the value 2 of the variable s by 1 to 3 (S2508b). The encrypted query generation unit 202 determines that the value 3 of the variable s is equal to the value 3 of p and proceeds to S2510b. The encrypted query generation unit 202 sets q(2, 3)=1 (S2510b). The encrypted query generation unit 202 sets the value of the variable s to p+1=4 (S2511b) and the process shifts to step S2503c.

The encrypted query generation unit 202 calculates $w_i$+s=1+4 (mod 3) and stores the solution 2 as w' (2, 4) (S2503c). The encrypted query generation unit 202 regards s and p, and $w_2$ and w' (2, 2) as integers and compares the magnitude therebetween (S2504c). Since the value of s is 4 and the value of p is 3, s>p holds. Since $w_2$=1 and w' (2, 4)=2, $w_2$<w' (2, 1) holds. Therefore, the process proceeds to step S2506c.

The encrypted query generation unit 202 generates a random number, stores the generated random number as new w' (2, 2) (S2506c), and proceeds to step S2507c. Since the variable s is 4, the encrypted query generation unit 202 replaces the variable s with an integer value of 4 or more and less than 6, further stores the value 4 obtained by replacing the value 4 of the variable s in the variable t, and sets w' (2, 4) to q (2, 4) (S2507c). The encrypted query generation unit 202 increases the value 4 of the variable s by 1 to 5 (S5408c). Since 5≠3 and 5≠6, s≠p and s≠2p hold, and the process shifts to step S2503d.

The encrypted query generation unit 202 calculates $w_t$+s=1+5 (mod 3) and stores the solution 0 as w' (2, 5) (S2503d). The encrypted query generation unit 202 regards s and p, and w' (2, 5) as integers and compares the magnitude therebetween (s2504d). Since the value of s is 5 and the value of p is 3, s>p holds. Since $w_2$=1 and w' (2, 5)=0, $w_2$>w' (2, 1) holds. Therefore, the processing shifts to step S2505d.

The encrypted query generation unit 202 concatenates the value 0 of w' (2, 5) with the secret key $sk_1$, stores a hash value $H_{sk1}$ (0) thereof as new w' (2, 5) (S2505d), and proceeds to step S2507d. Since the value of the variable s is 5, the encrypted query generation unit 202 replaces the variable s with an integer value of 4 or more and less than 6, further stores the value 5 obtained by replacing the value 5 of the variable s in the variable t, and sets w' (2, 5) to q(2, 5) (S2507d).

The encrypted query generation unit 202 increases the value 5 of the variable s by 1 to 6 (S2508d). Since 6=2*3, s=2p, and the process proceeds to step S2510d. Since the encrypted query generation unit 202 determines that the value 6 of the variable s is equal to the value 6 of 2p, the encrypted query generation unit 202 sets q (2, 6)=0 (S2512d).

The encrypted query generation unit 202 sets a set of q(2, 1), q(2, 2), q(2, 3), q(2, 4), q(2, 5), and q(2,6) as an encrypted query $q_2$ (S2513d). The encrypted query generation unit 202 decreases the value 2 of the variable i by 1 to 1 (S2514d). Since the value of the variable i is still 1 or more, the process shifts to step S2501e.

The encrypted query generation unit 202 initializes the variable s to 1 (S2501e). The encrypted query generation unit 202 extracts the value 10 of the block $w_2 w_i$ (S2502e). The encrypted query generation unit 202 calculates 10+s=10+1 (mod 3) and stores the solution 11 as w' (1, 1) (S2503e).

The encrypted query generation unit 202 regards s and p, $w_1$ and w' (1, 1) as integers and compares the magnitude therebetween (s2504e). Since the value of s is 1 and the value of p is 3, s<p holds. Since $w_i$=1 and w' (1, 1)=2, $w_i$<w' (1, 1) holds. Therefore, the process proceeds to step S2505e.

The encrypted query generation unit 202 concatenates the value (11) of $w_2$w' (1, 1) with the secret key $sk_1$, stores a hash value $H_{sk1}$ (11) thereof as new w' (2, 1) (S2505e), and proceeds to step S2507e.

Since the variable s is 1, the encrypted query generation unit 202 replaces the variable s with an integer value of 1 or more and less than 3, stores the value 1 obtained by replacing the value 1 of the variable s in the variable t, and sets w' (1, 1) to q(1, 1) (S2507e). The encrypted query generation unit 202 increases the value 1 of the variable s by 1 to 2 (S2508e). Since 2≠3, s≠p and s≠2p, and the process shifts to step S2503f. The encrypted query generation unit 202 calculates $w_t$+s=0+2 (mod 3), and stores the solution 2 as w' (1, 2) (S2503f).

The encrypted query generation unit 202 regards s and p, $w_2$ and w' (1, 2) as integers and compares the magnitude therebetween (s2504f). Since the value of s is 1 and the value of p is 3, s<p holds. Since $w_2$=0 and w' (1, 2)=2, $w_2$<w' (1, 2) holds. Therefore, the process proceeds to step S2505f.

The encrypted query generation unit 202 concatenates the value (12) of $w_2$w' (1, 2) with the secret key $sk_1$, stores a hash value $H_{sk1}$ (12) thereof as new w' (2, 2) (S2505f), and proceeds to step S2507f. Since the variable s is 2, the encrypted query generation unit 202 replaces the variable s with an integer value of 1 or more and less than 3, stores the value 2 obtained by replacing the value 2 of the variable s in the variable t, and sets w' (1, 2) to q(1, 2) (S2507f).

The encrypted query generation unit 202 increases the value 2 of the variable s by 1 to 3 (S2508f). Since 3=3, it is determined that the value 3 of the variable s is equal to the value 3 of p, and the process proceeds to step S2510f. The encrypted query generation unit 202 sets q(1, 3)=1 (S2510f). The encrypted query generation unit 202 sets the value of the variable s to p+1=4 (S2511f) and shifts to step S2503g.

The encrypted query generation unit 202 calculates $w_t$+s=0+4 (mod 3) and stores the solution 1 as w' (1, 4) (S2503g). The encrypted query generation unit 202 regards s and p, $w_2$ and w' (1, 4) as integers and compares the magnitude therebetween (s2504g). Since the value of s is 4 and the value of p is 3, s>p holds. Since $w_2$=0 and w' (1, 4)=1, $w_2$<w' (1, 4) holds. Therefore, the process proceeds to step S2506g.

The encrypted query generation unit 202 generates a random number, stores the random number as new w' (1, 4) (S2506g), and proceeds to step S2507g. Since the value of the variable s is 4, the encrypted query generation unit 202 replaces the variable s with an integer value of 4 or more and less than 6, further stores the value 5 obtained by replacing the value 4 of the variable s in the variable t, and sets w' (1, 4) to q(1, 5) (S2507g). The encrypted query generation unit 202 increases the value 4 of the variable s by 1 to 5 (S2508g). Since 5≠3 and 5≠6, s≠p and s≠2p hold, and the process shifts to step S2503h.

The encrypted query generation unit 202 calculates $w_t$+s=0+5 (mod 3) and stores the solution 2 as w' (1, 5) (S2503h). The encrypted query generation unit 202 regards s and p, $w_2$ and w' (1, 5) as integers and compares the magnitude therebetween (s2504h). Since the value of s is 5 and the value of p is 3, s>p holds. Since $w_1$=0 and w' (1, 5)=0, $w_2$>w' (1, 5) holds. Therefore, the process proceeds to step S2506h.

The encrypted query generation unit 202 generates a random number, stores the random number as new w' (1, 2) (S2506h), and proceeds to step S2507g. Since the value of the variable s is 5, the encrypted query generation unit 202 replaces the variable s with an integer value of 4 or more and less than 6, further stores the value 4 obtained by replacing the value 5 of the variable s in the variable t, and sets w' (1, 5) to q(1, 4) (S2507h).

The encrypted query generation unit 202 increases the value 5 of the variable s by 1 to 6 (S2508h). Since 6=2*3, it is determined that the value 6 of the variable s is equal to the value 6 of 2p, and the process proceeds to step S2512h. The encrypted query generation unit 202 sets q(1, 6)=0 (S2512h). The encrypted query generation unit 202 sets a set of q(1, 1), q(1, 2), q(1, 3), q(1, 4), q(1, 5), and q(1, 6) as an encrypted query $q_1$ (S2513h).

The encrypted query generation unit 202 decreases the value 1 of the variable i by 1 to 0 (S2514). Since the value of the variable i is less than 1, the process proceeds to step S2516. The encrypted query generation unit 202 shuffles $q_1$ and $q_2$. FIG. 15 illustrates an example in which $q_1$ and $q_2$ do not happen to be changed as a result of shuffling (S2516). The encrypted query generation unit 202 outputs $(q_2 q_1)$ as the encrypted query (S2517).

Figure 16:
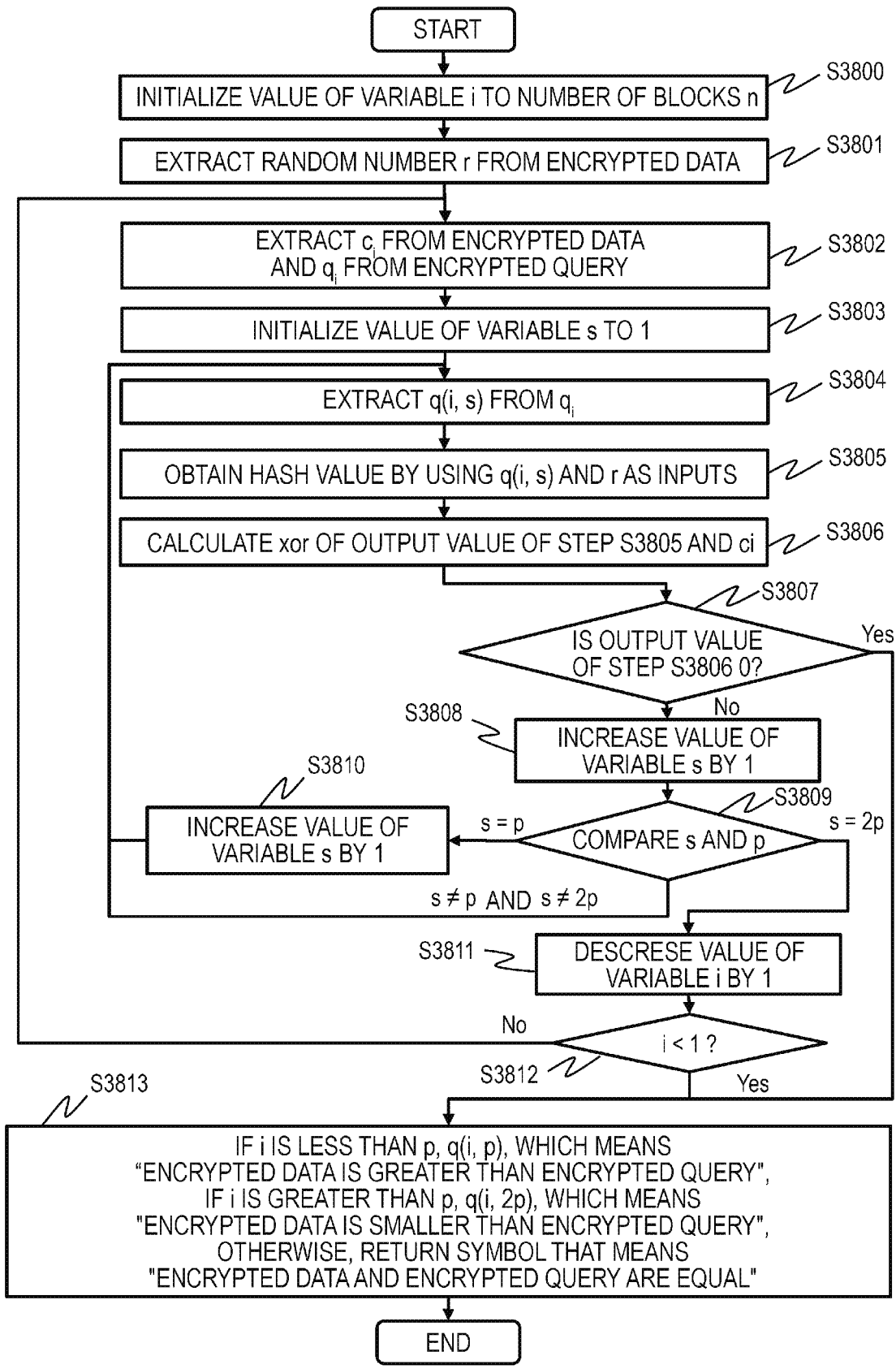
FIG. 16 is a flowchart illustrating an example of comparison processing between encrypted data and an encrypted query in Example 2.

FIG. 16 is a flowchart illustrating an example of the comparison processing between the encrypted data and the encrypted query in step S370. The data comparison unit 302 initializes the value of the variable i to n (S3800). The data comparison unit 302 extracts the random number r from the encrypted data (S3801). The data comparison unit 302 extracts $c_i$ from the encrypted data and $q_i$ from the encrypted query (S3802). The data comparison unit 302 initializes the value of the variable s to 1 (S3803).

The data comparison unit 302 extracts q(i, s) from $q_i$ (S3804). The data comparison unit 302 concatenates q(i, s) and the random number r and obtains a hash value $H_r(q(i, s))$ thereof (S3805). The hash function used in step S3805 is the same as the hash function used in step S1304. The data comparison unit 302 obtains an exclusive OR of the hash value obtained in step S3805 and $c_i$ (S3806). The data comparison unit 302 determines whether the value of the exclusive OR obtained in step S3806 is 0 (S3807).

If it is determined that the value obtained in step S3806 is 0 (S3807: Yes), the data comparison unit 302 proceeds to step S3813 described below. When it is determined that the value obtained in step S3806 is not 0 (S3807: No), the data comparison unit 302 increases the value of the variable s by 1 (S3808).

The data comparison unit 302 compares s with p (S3809). When it is determined in step S3809 that neither s=p nor s=2p, the data comparison unit 302 returns to step S3804. When it is determined in step S3809 that s=p, the data comparison unit 302 increases the value of the variable s by 1 (S3810) and returns to step S3802.

When it is determined in step S3809 that s=2p, the data comparison unit 302 decreases the value of the variable i by 1 (S3811) and determines whether i is less than 1 (S3812). When it is determined that i is 1 or more (S3811: No), the data comparison unit 302 returns to step S3804. When it is determined that i is less than 1 (S3811: Yes), the data comparison unit 302 proceeds to step S3813.

In step S3813, if it is determined that the value of the variable i is smaller than p, the data comparison unit 302 returns q(i, p) meaning "the plaintext is greater than the query", if it is determined that the value of the variable i is greater than p, returns q(i, 2p) meaning "the ciphertext is smaller than the query", or if it is determined otherwise, returns an output meaning "the plaintext and the query are equal" (S3813).

Figure 17:
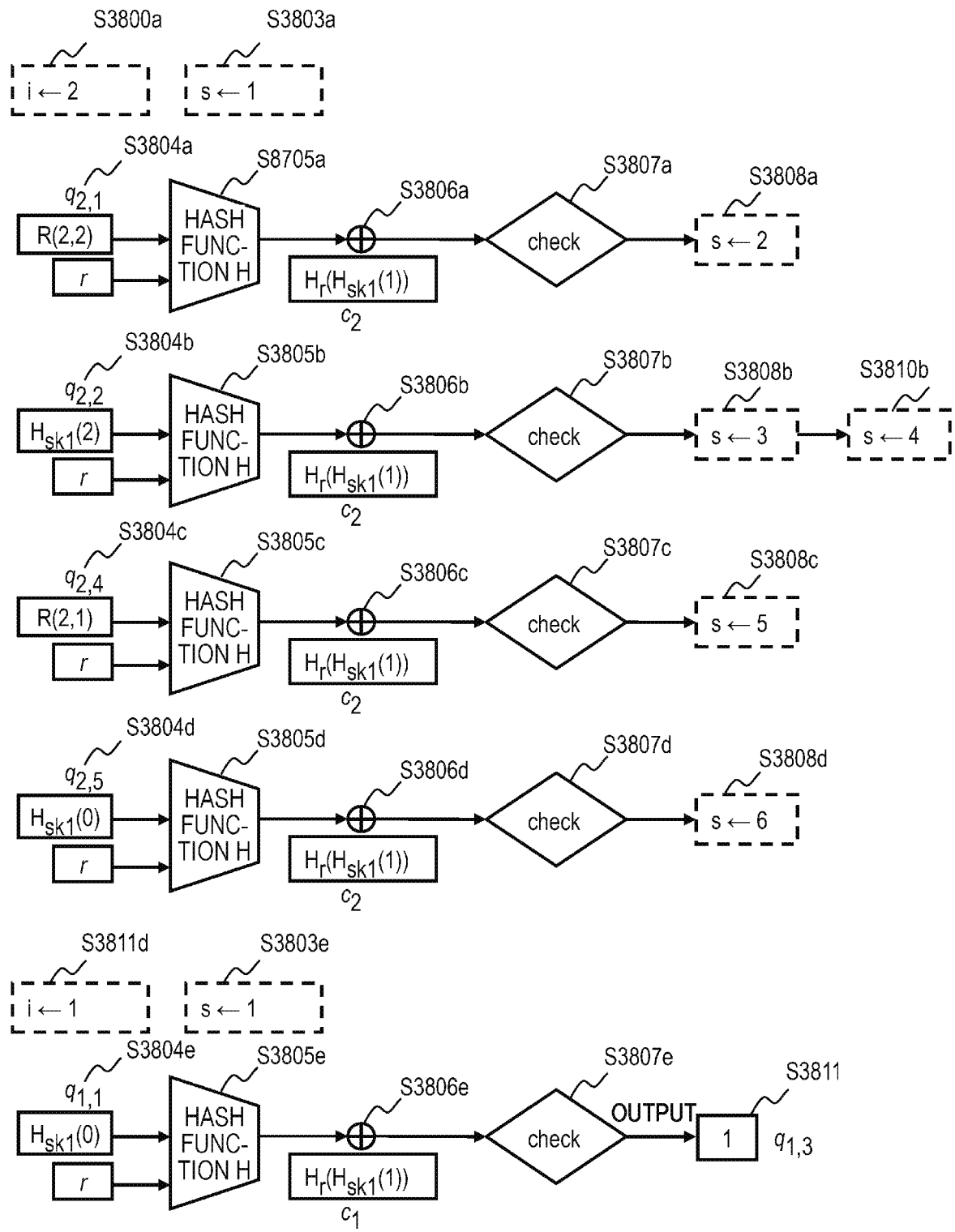
FIG. 17 is an explanatory diagram illustrating a specific example of comparison processing between encrypted data and an encrypted query in Example 2.

FIG. 17 is an explanatory diagram illustrating a specific example of comparison processing between encrypted data and an encrypted query. FIG. 17 illustrates an example of comparing the encrypted data of the data (12) generated in the example of FIG. 13 with the encrypted query of the query (10) generated in the example of FIG. 15. Since 12>10, in the example of FIG. 17, a comparison result that is finally determined that the data is larger than the query is output.

The data comparison unit 302 initializes the variable i to the number of blocks 2 (S3800). The data comparison unit 302 extracts the random number r from the encrypted data (S3801). The data comparison unit 302 extracts $q_2$ from the encrypted query (S3802).

The data comparison unit 302 initializes the variable s to 1 (S3803a). The data comparison unit 302 extracts q(2, 1) from $q_2$ (S3804a). A random number R(2, 2) is input to q(2, 1). The data comparison unit 302 concatenates R(2, 2), which is the value of q(2, 1), with the random number r and obtains a hash value $H_r(R(2, 2))$ thereof (S3805a).

The data comparison unit 302 extracts $c_2$ from the encrypted data and performs an xor operation on the value $H_r(H_{sk1}(1))$ and the hash value $H_r(R(2, 2))$ obtained in step S3703a (S3806a). As for the hash value of the value (1) and the hash value of the random number (R(2, 2)), since the possibility of duplicate values can be ignored as long as an appropriate hash function is used, a random number obtained by performing an xor operation of two different hash values is output as a result of the xor operation.

The data comparison unit 302 increases the value of the variable s by 1 to 2 to confirm that the value output in step S3806a is not 0 (S3807a) (S3808a). Since the value after the increment is neither 3 (=p) nor 6 (=2p), the process shifts to step S3804b.

The data comparison unit 302 extracts q(2, 2) from $q_2$ (S3804b). The hash value $H_{sk1}(2)$ is input to q(2, 2). The data comparison unit 302 concatenates the value $H_{sk1}(2)$ of q (2, 2) with the random number r and obtains a hash value $H_r(H_{sk1}(2))$ thereof (S3805b).

The data comparison unit 302 extracts $c_2$ from the encrypted data and performs an xor operation of the value $H_r(H_{sk1}(1))$ and the hash value $H_r(H_{sk1}(2))$ obtained in (S3703a) (S3806b). As for the hash value of the hash value ($H_{sk1}(2)$) and the hash value of the random number (R(2, 2)), since the possibility of duplicate values can be ignored as long as an appropriate hash function is used, a random number obtained by performing an xor operation of two different hash values is output as a result of the xor operation.

The data comparison unit 302 increases the value of the variable s by 1 to 3 to confirm that the value output in step S3706b is not 0 (S3807b) (S3808b). Since the value after the increment is 3, the data comparison unit 302 increases the value of the variable s by 1 to 4 (S3810) and shifts to step S3804c.

The data comparison unit 302 extracts q(2, 4) from $q_2$ (S3804c). A random number R(2, 1) is input to q(2, 4). The data comparison unit 302 concatenates the value R(2, 1) of q (2, 1) with the random number r and obtains a hash value $H_r(R(2, 1))$ thereof (S3805c).

The data comparison unit 302 extracts $c_2$ from the encrypted data and performs an xor operation on the value $H_r(H_{sk1}(1))$ and the hash value $H_r(R(2, 1))$ obtained in step S3703c (S3806c). As for the hash value of the value (1) and the hash value of the random number (R(2, 1)), since the possibility of duplicate values can be ignored as long as an appropriate hash function is used, a random number obtained by performing an xor operation of two different hash values is output as a result of the xor operation.

The data comparison unit 302 increases the value of the variable s by 1 to 5 to confirm that the value output in step S3706c is not 0 (S3807c) (S3808c). Since the value after the increment is neither 3 nor 6, the process shifts to step S3804d.

The data comparison unit 302 extracts q(2, 5) from $q_2$ (S3804d). The hash value $H_{sk1}(0)$ is input to q (2, 5). The data comparison unit 302 concatenates the value $H_{sk1}(0)$ of q(2, 5) with the random number r and obtains a hash value $H_r(H_{sk1}(0))$ thereof (S3805d).

The data comparison unit 302 extracts $c_2$ from the encrypted data, and performs an xor operation of the value H$_r$ (H$_{sk1}$ (1)) and the hash value H$_r$ (H$_{sk1}$ (0)) obtained in step S3703a (S3706d). As for the hash value of the hash value (H$_{sk1}$ (1)) and the hash value of the hash value (H$_{sk1}$ (0)), since the possibility of duplicate values can be ignored as long as an appropriate hash function is used, a random number obtained by performing an xor operation of two different hash values is output as a result of the xor operation.

The data comparison unit 302 increases the value of the variable s by 1 to 3 to confirm that the value output in step S3706d is not 0 (S3807d) (S3808). Since the value after the increment is 6, the data comparison unit 302 decreases the value of the variable i by 1 to 0 (S3810d) and shifts to step S3702e.

The data comparison unit 302 extracts q$_1$ from the encrypted query (S3802e). The data comparison unit 302 initializes the variable s to 1 (S3803e). The data comparison unit 302 extracts q(1, 1) from q$_1$ (S3804e). The hash value H$_{sk1}$ (12) is input to q(1, 1). The data comparison unit 302 concatenates the value H$_{sk1}$ (12) of q (1, 1) with the random number r and obtains a hash value H$_r$ (H$_{sk1}$ (12)) thereof (S3805e).

The data comparison unit 302 extracts c$_1$ from the encrypted data and performs an xor operation of the value H$_r$ (H$_{sk1}$ (12)) and the hash value H$_r$ (H$_{sk1}$ (12)) obtained in step S3703e (S3806e). Since the input values to the hash function are the same, the hash values are also the same. Therefore, this xor operation outputs 0.

The data comparison unit 302 proceeds to step S3813 to confirm that the value output in step S3706a is 0 (S3807). The data comparison unit 302 outputs q(1, 3) meaning a comparison result that "encrypted data is larger than the encrypted query" to confirm that the value 1 of the variable i is smaller than the value 3 of p (S3813).

As described above, the data comparison unit 302 can obtain a magnitude relationship that the data (12) is larger than the query (10) by comparing the encrypted data and the encrypted query with the data encrypted. In the above-described embodiment, for example, the data value is not limited to an integer, but may be a real number.

The present invention is not limited to the above-described examples and includes various modification examples. For example, the above-described embodiments have been described in detail for easy understanding of the present invention, and are not necessarily limited to those having all the configurations described. Apart of the configuration of one example can be replaced with the configuration of another example, and the configuration of another example can be added to the configuration of one example. It is possible to add, delete, and replace other configurations for a part of the configuration of each example.

Each of the above-described configurations, functions, processing units, processing means, and the like may be realized by hardware by designing a part or all thereof with, for example, an integrated circuit. Each of the above-described configurations, functions, and the like may be realized by software by a processor interpreting and executing a program that realizes each function. Information such as a program, a table, and a file for realizing each function can be stored in a recording device such as a memory, a hard disk, a solid state drive (SSD), or a recording medium such as an IC card, an SD card, or a DVD.

The control lines and information lines indicate what is considered necessary for the description, and not all the control lines and information lines are necessarily shown on the product. Actually, it may be considered that almost all the components are connected to each other.

What is claimed is:

1. A encrypted data comparison system comprising:
a registration computer;
a browsing computer; and
a data comparison computer,
wherein a registration target numerical value is expressed by N bits with or without 0 padding, wherein an N-th bit is a most significant bit (MSB), and a first bit is a leas significant bit (LSB),
wherein a processor of the registration computer is configured to perform:
(1) for each i-th bit of the N bits expressing the registration target numerical value:
    (1a) extract the N-th bit through the i-th bit of the N bits expressing the registration target numerical value,
    (1b) obtain a first hash value of the extracted bits of (1a) using a hash key which is shared by the browsing computer,
    (1c) obtain a second hash value of the first hash value using a certain random number,
    (1d) XOR the second hash value and i-th bit, and
    (1e) shuffle a storing position of the XORed second hash value in registration target encrypted data based on a shuffle key,
(2) using the shuffled storing positions of (1e), generate the registration target encrypted data including the XORed second hash value of (1d) and the certain random number, and
(3) send the registration target encrypted data to the data comparison computer for storing the registration target encrypted data in the data comparison computer,
wherein a comparison condition numerical value is expressed by N bits, wherein an N-th bit is a MSB, and a first bit is a LSB,
wherein a processor of the browsing computer is configured to:
(A) obtain the hash key and the shuffle key,
(B) for each k-th bit of the N bits expressing the comparison condition numerical value:
    (Ba) extract the N-th bit through the k-th bit from the N bits expressing the comparison condition numerical value,
    (Bb) XOR the extracted bits of (Ba) and 1,
    (Bc) obtain a third hash value of the XORed extracted bits of (Bb) using the hash key, and
    (Bd) shuffle a storing position of the third hash value in an encrypted query based on the shuffle key,
(C) generate the encrypted query including the third hash value of (Bc), using the shuffled storing position of (Bd), and
(D) send the encrypted query to the data comparison computer,
wherein a processor of the data comparison computer is configured to:
((a)) compare the registration target encrypted data with the encrypted query without using the hash key and the shuffle key for acquiring a comparison result that indicates:
    the registration target numerical value is greater than the comparison condition numerical value,
    the registration target numerical value is equal to the comparison condition numerical value, or
    the registration target numerical value is less than the comparison condition numerical value, and
((b)) generate result data based on the comparison result acquired in ((a)), and wherein, as the comparison of the registration target encrypted data with the encrypted query in ((a)), the processor of the data comparison computer is configured:
((aA)) obtain the certain random number from the registration target encrypted data, and
((aB)) with changing variable q between 1 and N :
((aBa)) obtain a q-th XORed second hash value stored in a q-th postion of the registration target encrypted data,
((aBb)) obtain a q-th third hash value stored in a q-th position of the encrypted query,
((aBc)) obtain a fourth hash value of the q-th third hash value using the certain random number, and
((aBd)) for acquiring the comparison result of ((a)), XOR the q-th XORed hash value and the fourth hash value.

2. The encrypted data comparison system according to the claim 1,
wherein the processor of the data comparison computer is configured to, if a result of XOR of ((aBd)) is 1 or 0 about a certain variable q, acquire the comparison result of ((a)) without waiting for a result of XOR of ((aBd)) regarding variable q.

3. The encrypted data comparison system according to the claim 2,
wherein the data comparison computer is a cloud server computer, and
wherein a hardware of the data comparison computer includes a memory, and is managed by a second user which is different than a first user of the registration computer.

4. One or more non-transitory computer readable medium storing:
first instructions for a processor of a registration computer;
second instructions for a processor of a browsing computer; and
third instructions for a processor of a data comparison computer,
wherein a registration target numerical value is expressed by N bits with or without 0 padding, wherein an N-th bit is a MSB, and a first bit is a LSB, wherein the first instructions, when executed, cause the processor of the registration computer to:
(1) for each i-th bit of the N bits expressing the registration target numerical value:
(1a) extract the N-th bit through the i-th bit of the N bits expressing the registration target numerical value,
(1b) obtain a first hash value of the extracted bits of (1a) using a hash key which is shared by the browsing computer,
(1c) obtain a second hash value of the first hash value using a certain random number,
(1d) XOR the second hash value and i-th bit, and
(1e) shuffle a storing position of the XORed second hash value in registration target encrypted data based on a shuffle key,
(2) using the shuffled storing positions of (1e), generate the registration target encrypted data including the XORed second hash value of (1d) and the certain random number, and
(3) send the registration target encrypted data to the data comparison computer for storing the registration target encrypted data in the data comparison computer, wherein a comparison condition numerical value is expressed by N bits, wherein an N-th bit is a MSB, and a first bit is a LSB,
wherein the second instructions, when executed, cause the processor of the browsing computer to:
(A) obtain the hash key and the shuffle key,
(B) for each k-th bit of the N bits expressing the comparison condition numerical value:
(Ba) extract the N-th bit through the k-th bit from the N bits expressing the comparison condition numerical value,
(Bb) XOR the extracted bits of (Ba) and 1,
(Bc) obtain a third hash value of the XORed extracted bits of (Bb) using the hash key, and
(Bd) shuffle a storing position of the third hash value in an encrypted query based on the shuffle key,
(C) generate the encrypted query including the third hash value of (Bc), using the shuffled storing position of (Bd), and
(D) send the encrypted query to the data comparison computer,
wherein the third instructions, when executed, cause the processor of the data comparison computer to:
((a)) compare the registration target encrypted data with the encrypted query without using the hash key and the shuffle key for acquiring a comparison result that indicates:
the registration target numerical value is greater than the comparison condition numerical value,
the registration target numerical value is equal to the comparison condition numerical value, or
the registration target numerical value is less than the comparison condition numerical value, and
((b)) generate result data based on the comparison result acquired in ((a)), and
wherein, as the comparison of the registration target encrypted data with the encrypted query in ((a)), the third instruction causes the processor of the data comparison computer to:
((aA)) obtain the certain random number from the registration target encrypted data, and
((aB)) with changing variable q between 1 and N:
((aBa)) obtain a q-th XORed second hash value stored in a q-th postion of the registration target encrypted data,
((aBb)) obtain a q-th third hash value stored in a q-th position of the encrypted query,
((aBc)) obtain a fourth hash value of the q-th third hash value using the certain random number, and
((aBd)) for acquiring the comparison result of ((a)), XOR the q-th XORed hash value and the fourth hash value.

5. The one or more non-transitory computer readable medium according to the claim 4,
wherein the processor of the data comparison computer is configured to, if a result of XOR of ((aBd)) is 1 or 0 about a certain variable q, acquire the comparison result of ((a)) without waiting for a result of XOR of ((aBd)) regarding variable q.

6. The one or more non-transitory computer readable medium according to the claim 5,
wherein the data comparison computer is a cloud server computer, and wherein a hardware of the data comparison computer includes a memory, and is managed by a second user which is different than a first user of the registration computer.

7. A browsing computer for an encrypted data comparison system including a registration computer and a data comparison computer, the browsing computer comprising:
  a processor;
   a memory storing first instructions; and
   a network interface,
  wherein a registration target numerical value is expressed by N bits with or without 0 padding, wherein an N-th bit is a MSB, and a first bit is a LSB, wherein a processor of the registration computer is configured:
  (1) for each i-th bit of the N bits expressing the registration target numerical value:
    (1a) extract the N-th bit through the i-th bit of the N bits expressing the registration target numerical value,
    (1b) obtain a first hash value of the extracted bits of (1a) using a hash key which is shared by the browsing computer,
    (1c) obtain a second hash value of the first hash value using a certain random number,
    (1d) XOR the second hash value and i-th bit, and
    (1e) shuffle a storing position of the XORed second hash value in registration target encrypted data based on a shuffle key,
  (2) using the shuffled storing positions of (1e), generate the registration target encrypted data including the XORed second hash value of (1d) and the certain random number, and
  (3) send the registration target encrypted data to the data comparison computer, for storing the registration target encrypted data in the data comparison computer,
  wherein a comparison condition numerical value is expressed by N bits, wherein an N-th bit is a MSB, and a first bit is a LSB,
  wherein the first instructions, when executed, cause, the processor of the browsing computer to:
  (A) obtain the hash key and the shuffle key,
  (B) for each k-th bit of the N bits expressing the comparison condition numerical value:
    (Ba) extract the N-th bit through the k-th bit from the N bits expressing the comparison condition numerical value,
    (Bb) XOR the extracted bits of (Ba) and 1,
    (Bc) obtain a third hash value of the XORed extracted bits of (Bb) using the hash key, and
    (Bd) shuffle a storing position of the third hash value in an encrypted query based on the shuffle key,
  (C) generate the encrypted query including the third hash value of (Bc), using the shuffled storing position of (Bd), in the memory, and
  (D) send the encrypted query to the data comparison computer using the network interface for the data comparison computer performing to data comparison processing, and
  (E) receive result data of the data comparison processing using the network interface,
  wherein as the data comparison processing, a processor of the data comparison computer is configured to:
  ((a)) compare the registration target encrypted data with the encrypted query without using the hash key and the shuffle key for acquiring a comparison result that indicates:
    the registration target numerical value is greater than the comparison condition numerical value,
    the registration target numerical value is equal to the comparison condition numerical value, or
    the registration target numerical value is less than the comparison condition numerical value, and
  ((b)) generate the result data based on the comparison result acquired in ((a)), and
  wherein, as the comparison of the registration target encrypted data with the encrypted query in ((a)), the processor of the data comparison computer is configured:
  ((aA)) obtain the certain random number from the registration target encrypted data, and
  ((aB)) with changing variable q between 1 and N:
    ((aBa)) obtain a q-th XORed second hash value stored in a q-th postion of the registration target encrypted data,
    ((aBb)) obtain a q-th third hash value stored in a q-th position of the encrypted query,
    ((aBc)) obtain a fourth hash value of the q-th third hash value using the certain random number, and
    ((aBd)) for acquiring the comparison result of ((a)), XOR the q-th XORed hash value and the fourth hash value.

8. The browsing computer for an encrypted data comparison system according to the claim 7,
  wherein the processor of the data comparison computer is configured to, if a result of XOR of ((aBd)) is 1 or 0 about a certain variable q, acquire the comparison result of ((a)) without waiting for a result of XOR of ((aBd)) regarding variable q.

9. The browsing computer for an encrypted data comparison system according to the claim 8,
  wherein the data comparison computer is a cloud server computer, and
  wherein a hardware of the data comparison computer includes a memory, and is managed by a second user which is different than a first user of the registration computer.

* * * * *